US012764239B2

(12) United States Patent
Ichikawa et al.

(10) Patent No.: US 12,764,239 B2
(45) Date of Patent: Oct. 13, 2026

(54) IMAGE FORMING APPARATUS

(71) Applicant: BROTHER KOGYO KABUSHIKI KAISHA, Nagoya (JP)

(72) Inventors: Kazuki Ichikawa, Gamagori (JP); Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 93 days.

(21) Appl. No.: 18/895,589

(22) Filed: Sep. 25, 2024

(65) Prior Publication Data

US 2025/0112999 A1 Apr. 3, 2025

(30) Foreign Application Priority Data

Sep. 29, 2023 (JP) ................................ 2023-169568

(51) Int. Cl.
*H04N 1/00* (2006.01)
*B41J 29/00* (2006.01)
*G03G 15/00* (2006.01)
*H04N 1/44* (2006.01)

(52) U.S. Cl.
CPC .......... *H04N 1/00395* (2013.01); *B41J 29/00* (2013.01); *G03G 15/502* (2013.01); *H04N 1/00408* (2013.01); *H04N 1/00482* (2013.01); *H04N 1/4413* (2013.01); *H04N 1/4433* (2013.01)

(58) Field of Classification Search
CPC .......... H04N 1/00395; H04N 1/00408; H04N 1/00482; H04N 1/4413; H04N 1/4433; H04N 1/0035; B41J 29/00; G03G 15/502
USPC ........................................................ 358/1.14
See application file for complete search history.

(56) References Cited

U.S. PATENT DOCUMENTS

2010/0259778 A1* 10/2010 Kashioka .............. G06F 3/1222 358/1.14
2012/0320421 A1 12/2012 Van Vonderen et al.
2018/0316802 A1 11/2018 Takamiya et al.

FOREIGN PATENT DOCUMENTS

JP 2018-191057 A 11/2018

* cited by examiner

*Primary Examiner* — Charlotte M Baker
(74) *Attorney, Agent, or Firm* — Scully, Scott, Murphy & Presser, P. C.

(57) ABSTRACT

In image forming apparatus according to the present disclosure, a controller causes a setting icon to transition to a locked state in response to an operation received via a user I/F. In a case where a temporarily releasing operation of temporarily releasing the locked state is performed in the locked state, the controller causes the user I/F to be in a temporarily released state. The controller is configured to release the temporarily released state and to cause the user interface to return to the locked state, triggered by the temporarily released state having been continued for a predetermined period of time.

30 Claims, 16 Drawing Sheets

31

| | |
|---|---|
| SETTING LOCK | “OFF” |
| SETTING LOCK PASSWORD | XXXX |

FIG. 14

35

| | |
|---|---|
| SETTING LOCK | "ON" |
| General Setup LOCK | "ON" |
| Shortcut settings LOCK | "ON" |
| Fax LOCK | "ON" |
| Network LOCK | "OFF" |
| • • • | • • • |
| XXXX | "ON" |

IMAGE FORMING APPARATUS

REFERENCE TO RELATED APPLICATIONS

This application claims priority from Japanese Patent Application No. 2023-169568 filed on Sep. 29, 2023. The entire content of the priority application is incorporated herein by reference.

BACKGROUND ART

An image forming apparatus which causes a user interface to display a setting screen and which causes a memory to store a setting value in accordance with an operation received with respect to the setting screen is known. In a case where the image forming apparatus receives an instruction to be in a locked state, from an external apparatus such as a PC via a network, the image forming apparatus does not permit the display of the setting screen through the user interface.

SUMMARY

The image forming apparatus described above requires switching between the transition to the locked state and the release from the locked state, by the instruction from the external apparatus such as the PC, etc. Therefore, in a case where the user interface which is in the locked state is caused to display the setting screen, a user is forced to perform a complicated operation such as operating the external apparatus.

The present disclosure has been made in consideration of the above-described problem. An object of the present disclosure is to provide an image forming apparatus configured to perform the display of the setting screen and the non-display of the setting screen in the user interface which is in the locked state, without forcing the user to perform any complicated operation.

An image forming apparatus according to an aspect of the present disclosure includes: a user interface; a memory; and a controller. The controller is configured to execute a process related to image formation in accordance with a setting value stored in the memory. The controller is configured: to cause the user interface to display a standby screen including a screen display icon; and to cause the user interface to display a setting screen in response to the screen display icon having been operated on the standby screen, and to cause memory to store the setting value in response to an operation received on the setting screen. The controller is configured to cause the user interface to transition to a locked state in response to an operation received via the user interface, the locked state being a state in which the controller does not allow the user interface to display the setting screen even in a case where the screen display icon is operated. In a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated, and the controller is configured to end the temporarily released state by a trigger which is different from an operation serving a trigger for the locked state-transition process. The controller is configured to cause the user interface to display a setting screen related to printing, in response to the screen displaying icon having been operated on the standby screen, and the controller is configured to cause the memory to store the setting value, in response to an operation received with respect to the setting screen related to the printing. The controller is configured to receive, on the setting screen related to the printing, at least one of an operation of specifying a printer description language to be emulated, an operation of specifying print quality, an operation of specifying whether to turn on double-sided printing or not, an operation of specifying a type of a sheet, an operation of specifying a size of the sheet, and an operation of specifying a print offset.

In the above-described configuration, the controller of the image forming apparatus causes the user interface to transition to the locked state in which the controller does not allow the user interface to display the setting screen even in a case where the screen display icon is operated. Afterward, in a case where the temporarily releasing operation is performed, the controller is configured to cause the user I/F to be in the temporarily released state in which the controller allows the user interface to display the setting screen. Then, triggered by the temporarily released state having been continued for a predetermined period of time, the controller is configured to release the user I/F from the temporarily released state and to cause the user interface to return to the locked state. With this, the display of the setting screen and the non-display of the setting screen in the user interface which is in the locked state can be performed, without forcing the user to perform any complicated operation.

BRIEF DESCRIPTION OF DRAWINGS

FIG. 14 is a diagram describing lock function setting information.

DESCRIPTION

First Embodiment

Figure 1:
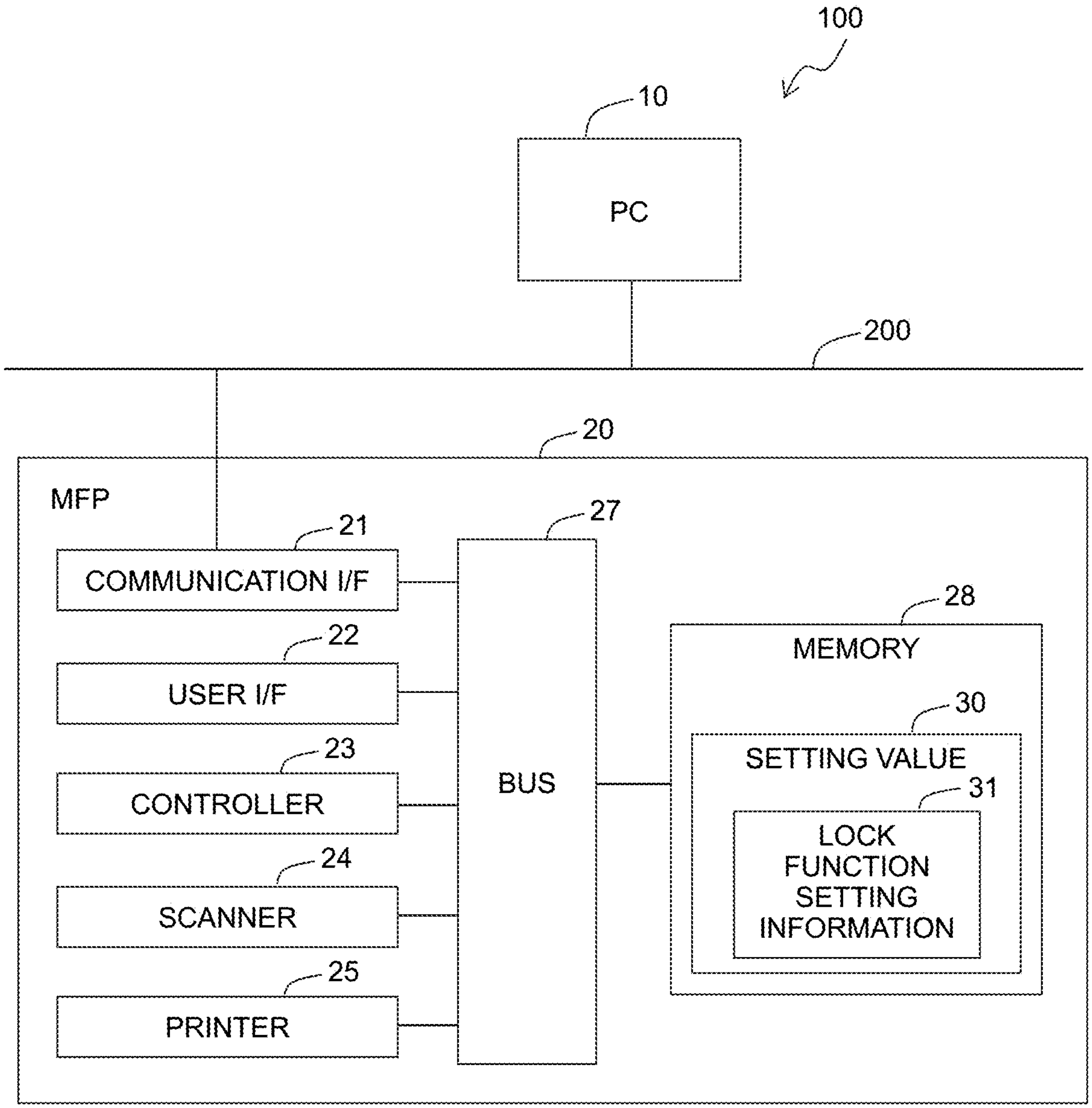
FIG. 1 is a diagram depicting the configuration of an image forming system.

An image forming system according to a first embodiment will be described with reference to the drawings. An image forming system 100 depicted in FIG. 1 includes a PC 10 and an MFP 20 which is an example of an image forming apparatus. Note that the MFP is an abbreviation for Multi-function Peripheral.

The PC 10 mainly includes a non-illustrated CPU, memory, user I/F, and network I/F. Note that the term "I/F" is an abbreviation for "interface". Since each of these components is the same as each of the components included in the MFP 20, the description therefor will be given later. An OS is stored in a memory of the PC 10. Non-illustrated application programs are incorporated into the OS. The application programs are programs which instruct, via the OS, the MFP 20 connected to the PC 10 to perform a print operation and a scan operation. The application programs may be standard application programs provided by the OS.

The MFP 20 includes a communication I/F 21, a user I/F 22, a controller 23, a scanner 24, a printer 25, and a memory 28. The above-described components are connected to one another via a bus 27 to be capable of communicating with one another.

The communication I/F 21 connects the MFP 20 to a network 200. This allows the MFP 20 to communicate with the PC 10 via the network 200 in accordance with a predetermined protocol. The scanner 24 has, for example, a reading sensor such as a CCD or CIS, and generates image data in accordance with reading of an original. The generation of the image data is an example of "image formation". The printer 25 executes a print operation of printing an image on a recording medium such as a sheet or a disc. The sheet is also referred to as a paper sheet. The printing is an example of the "image formation". The ink-jet system, the electrophotographic system, etc., can be adopted as the recording system of the printer 25.

The user I/F 22 is an interface capable of receiving various operations by a user with respect to the MFP 20. The user I/F 22 includes a touch panel including a liquid crystal display, and various switches.

The memory 28 is constructed by combining a volatile memory such as RAM, a non-volatile memory such as NVRAM, ROM, etc. As the non-volatile memory, SSD, HDD, etc. may be used. A buffer included in the controller 23 and used in a case where various programs are executed may also be considered as a part of the memory 28. Note that the memory 28 may be a storage medium readable by the controller 23. The term "storage medium readable by the controller 23" is a non-transitory medium. In addition to the above-described examples, the non-transitory medium also includes a storage medium such as a CD-ROM and a DVD-ROM. Further, the non-transitory medium is also a tangible medium. On the other hand, electrical signals which carry a program downloaded from a server on the Internet are, for example, a computer-readable signal medium which is a kind of a computer-readable medium, but is not included in the non-transitory and computer-readable storage medium.

The controller 23 is constructed by combining a CPU and an internal memory. The following description in the present embodiment basically indicates processes performed by the controller 23 11 in accordance with instructions described in a program. That is, the processes such as "determination", "extraction", "selection", "calculation", "decision", "specification", "obtainment", "reception", and "control" in the following description represent the processes performed by the controller 23. Note that the "obtainment" is used as a concept which does not require a request. That is, the process in which the controller 23 receives data without requesting the data is also included in the concept of "the controller 23 obtains data". Further, the term "data" in the present specification is represented by a computer-readable bit string. Furthermore, multiple data with substantially the same meaning but in different formats shall be treated as the same data. The same applies also to the term "information" in the present specification. Note that the controller 23 is not limited to being one controller and may be constructed of a plurality of controllers. In this case, the respective processes to be executed by the controller 23, which will be described later, may be distributed and executed by the plurality of controllers.

Figure 2A:
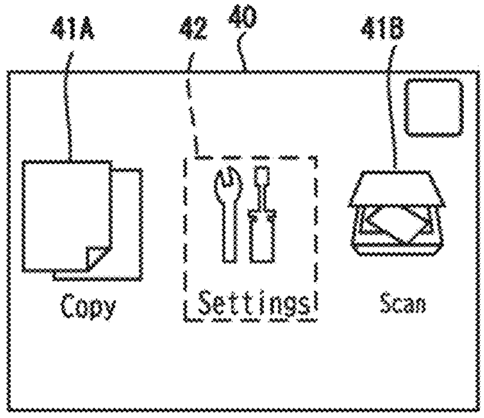
FIGS. 2A to 2F are diagrams depicting transition of screens displayed on a user I/F.

Next, a process executed by the controller 23 in response to an operation received by the user I/F 22 of the MFP 20 will be described. For example, in a state which is immediately after the power supply of the MFP 20 is turned on and the starting process is completed, the user I/F 22 displays a standby screen 40 depicted in FIG. 2A. The standby screen 40 includes operation icons 41A, 41B and 42 each of which is configured to receive an instruction from a user. Among the operation icons 41A, 41B and 42, the operation icon 41A is a copy icon 41A configured to receive an operation from a user in a case where a process related to a copy function included in the MFP 20 is executed. The copy function is a function of printing, on a sheet by the printer 25, scan data (an example of image data) generated by reading an original by the scanner 24. The operation icon 41B is a scan icon 41B configured to receive an operation by the user in a case where a process related to a scan function included in the MFP 20 is executed. The scan function is a function of causing the scanner 24 to read an original to thereby generate scan data and of storing the generated scan data in a designated destination of storage. The operation icon 42 is a setting icon 42 configured to receive an operation for causing the user I/F 22 to display a setting menu screen 50 which will be described later. The setting menu screen 50 is a screen configured to receive instructions, respectively, for various settings of the MFP 20. In the present embodiment, there is no substantial difference between the terms "icon" and "button" per se. Each of these terms means an image indicating an option to be operated. The "icon" may be rephrased as the "button", or vice versa. In the present embodiment, a process in which the controller 23 displays the standby screen 40 after the starting process is an example of a "standby screen displaying process".

Note that by slidably operating the standby screen 40, operation icons each of which is configured to execute one of the processes related to functions not depicted and other than the copy function and the scan function (e.g., a print function, a FAX transmission and reception function) can also be displayed. The print function is a function of causing the printer 25 to print, on a sheet, image data stored in a portable memory attached to the MFP 20, image data stored in the memory 28, etc. The FAX transmission and reception function is a function of causing the printer 25 to print, on a sheet, FAX reception data (an example of the "image data") received from an external device via a network, and a function of transmitting FAX transmission data (an example of the "image data") generated by performing reading with the scanner 24 to a specified address via the communication I/F 21.

Figures 3, 4:
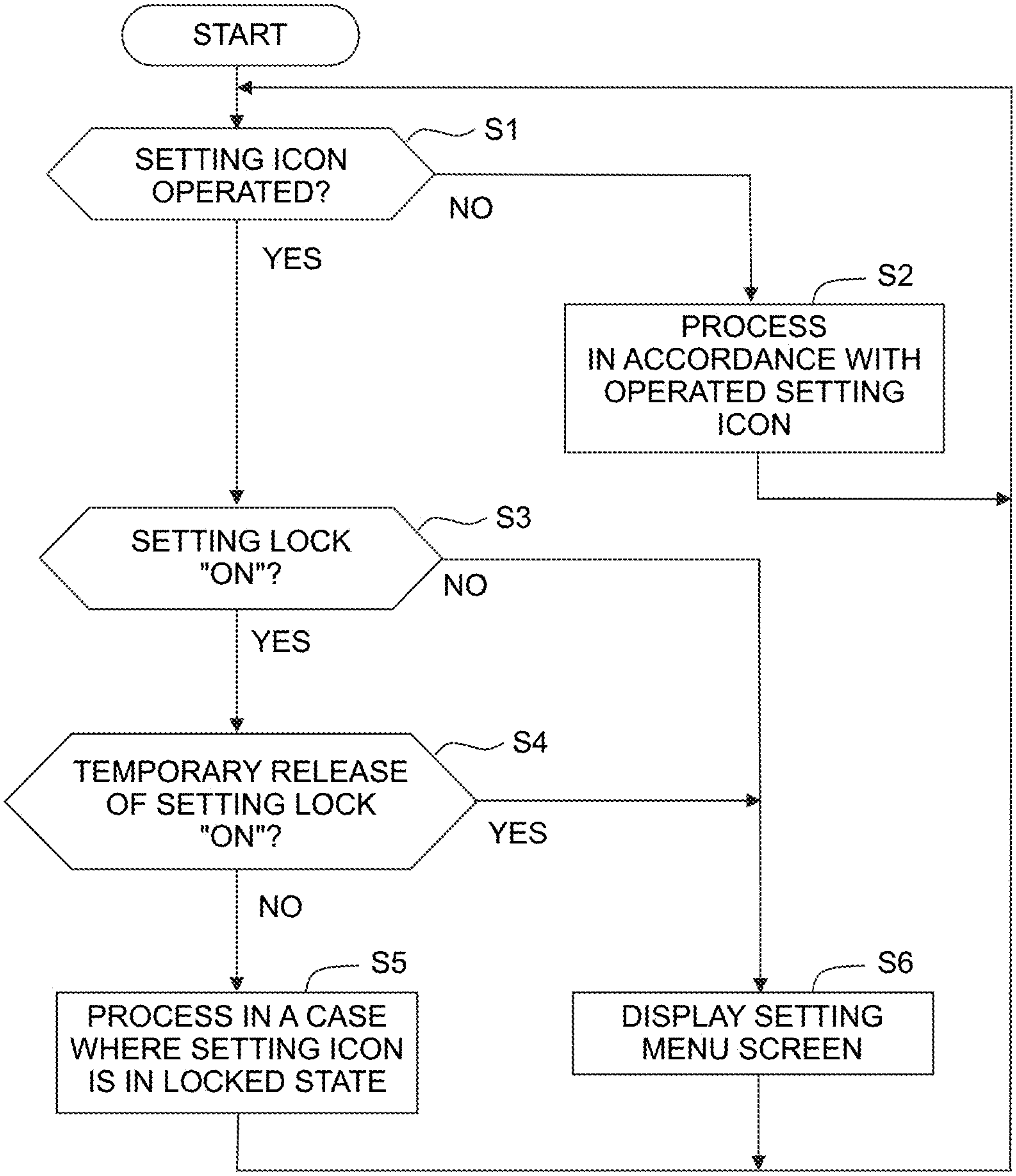
FIG. 3 is a flowchart describing the procedure of a process which is executed in response to an operation on a standby screen.
FIG. 4 is a diagram describing lock function setting information.

In a case where the controller 23 detects that any of the icons is operated with respect to the standby screen 40, the controller 23 executes a procedure of a flowchart depicted in FIG. 3. First, in step 1 (in the following, the "step" will also be referred to as "S"; for example, step 1 is described as "step S1"), the controller 23 determines whether the operated icon is the setting icon 42. In a case where the controller 23 determines that the operated icon is an icon other than the setting icon 42 (step S1: NO), the controller 23 proceeds to step S2 and executes a process in accordance with the operated icon.

For example, in a case where the operated icon is the copy icon 41A, the controller 23 causes the user I/F 22 to display a screen for receiving a setting operation related to the copy function. In a case where the controller 23 receives the operation with respect to each of the various settings, the controller 23 causes the memory 28 to store a setting value 30 in accordance with the received operation, and the controller 23 executes a copying operation including generation of the image data by reading the original and printing of the generated image data. Setting items of the setting value 30 which are set in response to the operation of the copy icon 41A and stored in the memory 28 include the resolution of the original to be read, the color setting, the sheet size of the recording sheet, etc. Note that in a case where the operated icon is the scan icon 41B, the controller 23 causes the user I/F 22 to display a screen for receiving a setting operation related to the scan function. The controller 23 causes the memory 28 to store the setting value 30 in accordance with the received operation, and the controller 23 executes the scan operation of generating the image data by reading the original. Setting items of the setting value 30 which are set in response to the operation of the scan icon 43 and stored in the memory 28 are the resolution of the original to be read, the color setting, the name of a folder as a destination of output data, etc. Note that in a case where the operated icon is the icon related to the print function, the controller 23 causes the user I/F 22 to display a screen for receiving a setting operation related to the print operation. The controller 23 causes the memory 28 to store the setting value 30 corresponding to the received operation, and the controller 23 executes the print operation by using the setting value 30 stored in the memory 28. Setting items of the setting value 30 which are set in response to the operation of the icon related to the print function and stored in the memory 28 are the source of obtainment of the image data to be printed, selection of the image data to be printed, the number of print copies, etc. The term "source of obtainment of the image data" means, for example, a USB memory (a kind of the portable memory) attached to the MFP 20, a network storage connected to the MFP 20 via the communication I/F 21, a storage area for image data in the memory 28, etc. The image data to be printed is selected, for example, from the image data stored in the source of obtainment of the image data.

The setting value input via a screen displayed in response to the operation of either one of the operation icons 41A and 41B is basically stored, by the controller 23, in a volatile memory (hereinafter also referred to as a "volatile area") of the memory 28. Further, basically, after an operation in accordance with the operated icon is executed, the setting value is automatically deleted from the memory 28. Note that the setting value 30 input via the screen displayed in response to the operation of either one the icons 41A and 41B may be stored in the non-volatile area of the memory 28 by the controller 23, similar to the setting value set by an operation via the setting menu screen 50 displayed in response to an operation on the setting icon 42 which will be described later. The setting value 30 may remain stored in the memory 28 even after the operation in accordance with the operated icon is executed. For example, the controller 23 may execute the print operation of printing image data, which is included in a print job transmitted from the PC 10, by using the setting value stored in the memory 28. In the present embodiment, a process in which controller 23 stores the setting value in memory 28 in step S2 is an example of a "setting value storing process".

On the other hand, in a case where the operated icon is the setting icon 42 (step S1: YES), the controller 23 proceeds to step S3 and determines whether the setting lock is set to ON. Specifically, the controller 23 refers to lock function setting information 31 which is a kind of the setting value 30 stored in the memory 28.

As depicted in FIG. 4, the lock function setting information 31 is information in which a setting value related to the setting lock included in the MFP 20 is registered. The setting lock invalidates the operation of the setting icon 42 even in a case where the setting icon 42 is operated on the standby screen 40 of the MFP 20, and, for example, causes the MFP 20 to be in a state in which the user I/F 22 is not allowed to display the screen related to the setting icon 42. The lock function setting information 31 includes an item "setting lock" and an item "setting lock password". The item "setting lock" is information indicating whether the MFP 20 is in either one of an "ON" state in which the setting lock is applied to the MFP 20 and a "OFF" state in which the setting lock is not applied to the MFP 20. In a case where the setting value of the item "setting lock" is "ON", this indicates that the setting lock is applied to the MFP 20; whereas in a case where the setting value is "OFF", this indicates that the setting lock is not applied to the MFP 20. The item "setting lock password" is a password required in a case where the setting related to the setting lock is to be changed. The details of the setting lock password will be described later.

Note that the setting value of the item "setting lock" may be simply described as a "value indicating the setting lock". In the MFP 20 in the factory default state, the setting value of the item setting lock (i.e., the value indicating the setting lock) indicates "OFF". Here, a case where the value indicating the setting lock indicates "OFF" and the setting lock is not applied to the MFP 20 (step S3: NO) is described, and the description proceeds to step S6.

Figure 2B:
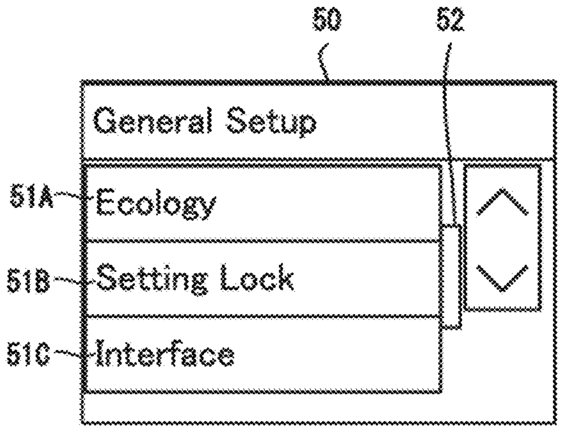

In step S6, the controller 23 causes the user I/F 22 to display the setting menu screen 50 depicted in FIG. 2B. The setting menu screen 50 is an example of the setting screen. The setting menu screen 50 is a screen configured to receive a selective operation with respect to options which are lower-level setting screens to be displayed, in response to the operation of the setting icon 42; the setting menu screen 50 includes selection icons 51A, 51B, and 51C corresponding, respectively, to the kinds of setting items. Each of the lower-level setting screens which is associated with one of the selection icons is an example of the setting screen. The selection icon "Setting Lock" 51B is an icon which receives the selective operation in a case where the controller 23 causes the user I/F 22 to display a setting screen related to the setting lock. In a case where any one of the icons is operated, the controller 23 causes the user I/F 22 to display a setting screen related to the selected item.

By slidably operating the slide bar 52 in the setting menu screen 50, an icon other than the icons depicted in FIG. 2B can also be displayed. For example, an icon "General Setup" configured to display a setting screen related to the overall operation of the MFP 20 can be displayed. The setting screen related to the overall operation of the MFP 20 can receive, for example, input of a setting value used for communication via the communication I/F 21. For example, the image data generated by reading the original with the scanner 24 is transmitted via the communication I/F 21. For example, the image data received via the communication I/F 21 is printed by the printer 25. Further, by slidably operating the slide bar, a selection icon can be displayed, which is an icon for selecting "Shortcut Settings" which is a function of displaying a setting screen related to shortcuts. The setting screen related to shortcuts can receive, for example, input of a shortcut setting value of the copying operation. Note that a shortcut icon corresponding to the short-cut setting value is displayed on the standby screen 40. Setting items of the shortcut-setting value of the copying operation are the same as the setting items of the setting value of the copying operation described above. By slidably operating the slide bar 52, an icon "Print" configured to display a setting screen related to the printing, in general, can be displayed. The setting screen related to the printing, in general, receives input of setting values related to the printing in general, including the copying operation and the print operation. The setting value related to the printing in general is, for example, an adjustment parameter used by the printer 25.

Note that the setting value input via the setting screen displayed in response to the operation of each of the selection icons 51A to 51C is basically stored, by the controller 23, in the non-volatile area of the memory 28. Further, basically, the setting value which has been input is not automatically deleted and remains stored in the memory 28. For example, in a case where the user performs an operation of calling the shortcut-setting value of the copying operation stored in the memory 28, for example, the operation with respect to the shortcut icon, then the copying operation in accordance with the shortcut-setting value is executed. Even after the copying operation has been executed, the controller 23 does not automatically delete the shortcut-setting value. In a case where a predetermined operation is performed on the setting screen, the controller 23 returns the display of the user I/F 22 to the standby screen 40.

In a case where the operation of any one of the selection icons is performed on the setting menu screen 50 displayed on the user I/F 22, the controller 23 detects this operation (step S1: NO) and executes, in step S2, a process in accordance with the operation of the icon on the setting menu screen 50. After executing the process, the controller 23 returns the display of the user I/F 22 to the standby screen 40. Note that, in a case where a predetermined operation is performed after the controller 23 has executed the process, the controller 23 may return the display of the user I/F 22 to the standby screen 40. Note that, in a case where an icon for not displaying the setting menu screen 50 is operated on the setting menu screen 50, the controller 23 causes the user I/F 22 not to display the setting menu screen 50 and causes the user I/F 22 to display the standby screen 40 in step S2.

Next, a process of performing switching from the state in which the setting lock is not applied to the MFP 20 to the state in which the setting lock is applied to the MFP 20 will be described. The process of performing switching between the application and the non-application of the setting lock is performed first by operating the setting lock selection icon "Setting Lock" 51B on the setting menu screen 50 depicted in FIG. 2B, and then by performing the switching on a screen displayed on the user I/F 22 in response to this operation. Therefore, first, in order to display the setting menu screen 50, the setting lock is required to be turned "OFF" in which the setting lock is not applied (step S3: NO).

Figure 2C:
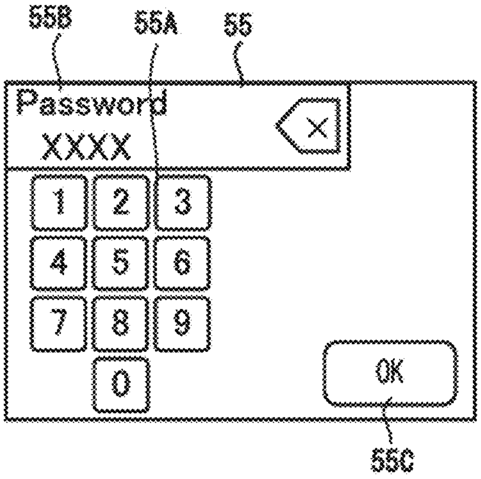
Figure 5:
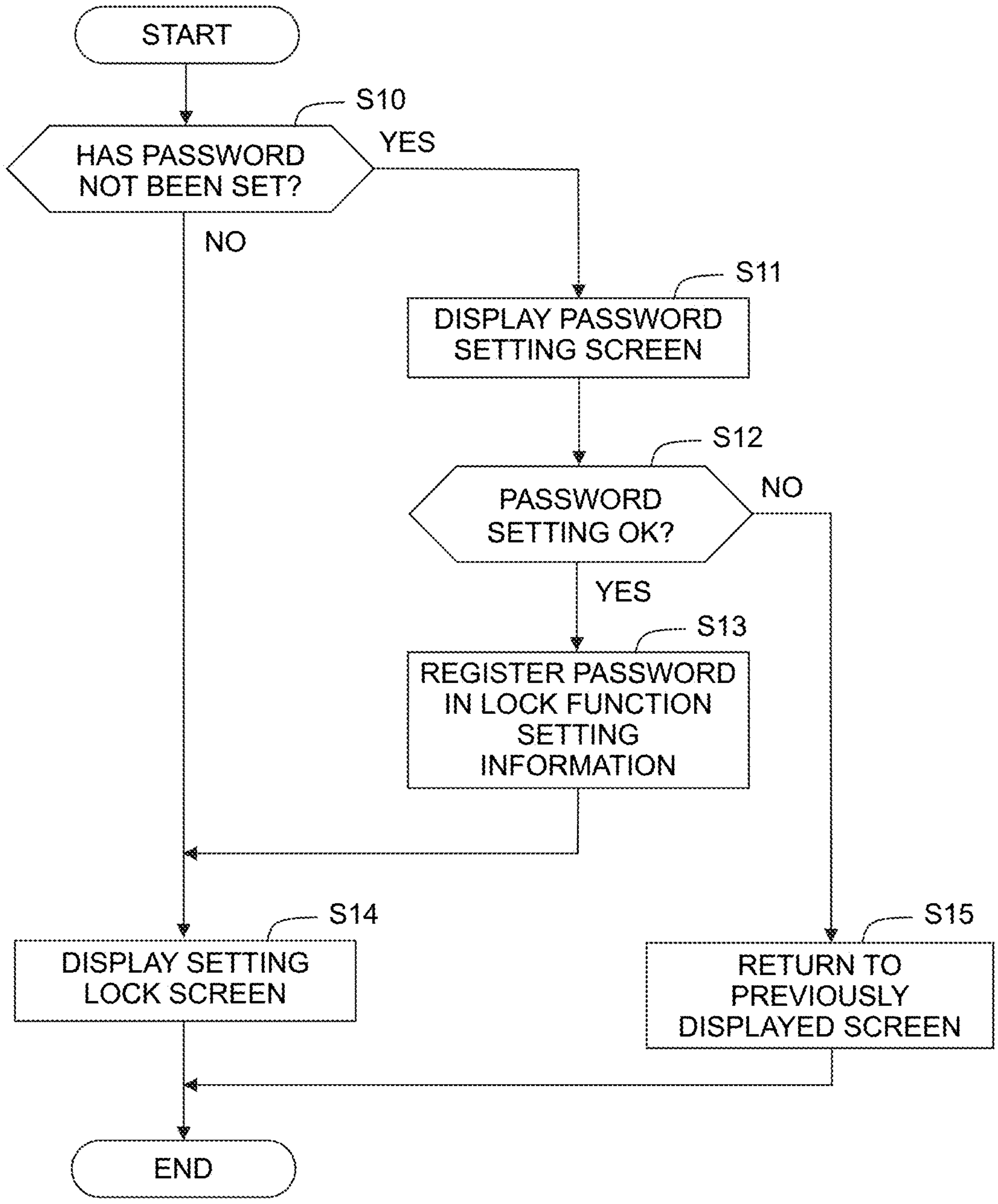
FIG. 5 is a flowchart describing the procedure of a process of changing the lock function setting information.

In a case where the controller 23 detects that the selection icon "Setting Lock" 51B has been operated on the setting menu screen 50, the controller 23 executes a process depicted in FIG. 5. First, in step S10, the controller 23 determines whether a setting lock password has not been set. The "setting lock password" is a password registered as a setting value for the item "setting lock password" in the lock function setting information 31. In a case where the setting value of the item "setting lock password" has not been registered in the lock function setting information 31 (step S10: YES), the controller 23 proceeds to step S11 and causes the user I/F 22 to display a password setting screen 55 depicted in FIG. 2C.

The password setting screen 55 includes an input key 55A which receives an operation to input the setting lock password, a password display column 85B which displays the input setting lock password at least for a short period of time, and an OK button 55C which receives confirmation of the input setting lock password (i.e., a registering instruction). In a case where the user operates the password setting screen 55 so as to input a new setting lock password and operates the OK button 55C (step S12: YES), the controller 23 proceeds to step S13, and the controller 23 registers the newly input setting lock password as the setting value of the item "setting lock password" of the lock function setting information 31 stored in the non-volatile area of the memory 28.

Figure 2D:
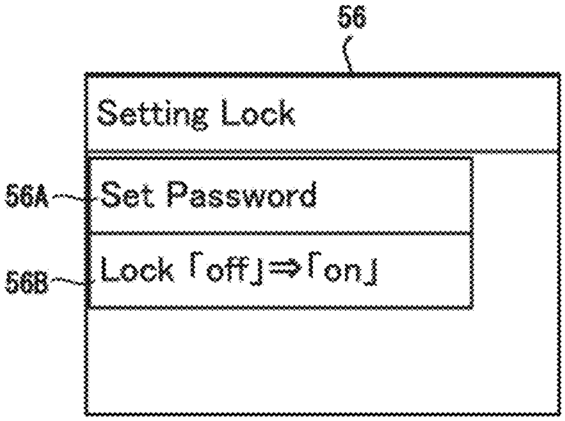

The controller 23 proceeds to step S14 and causes the user I/F 22 to display a Setting Lock screen 56 depicted in FIG. 2D. The Setting Lock screen 56 includes selection icons 56A and 56B configured to receive a setting instruction related to the setting lock. The selection icon 56A is an icon configured to receive the registering instruction or changing instruction of the setting lock password as described above. For example, in a case where the selection icon 56A is operated, the password setting screen 55 depicted in FIG. 2C, as described above, is displayed on the user I/F 22, and the controller 23 is capable of receiving the operation of registering or changing the setting lock password. The selection icon 56B is an icon configured to receive an instruction to switch the setting lock to either "ON" so as to apply the setting lock or "OFF" so as not to apply the setting lock. Note that in this example, since the setting value of the item "setting lock" in the lock function setting information 31 is set to "OFF", the display in text of the selection icon 56B indicates "Lock off→on" i.e., indicates that the setting lock can be changed from "OFF" to "ON".

Figure 2E:
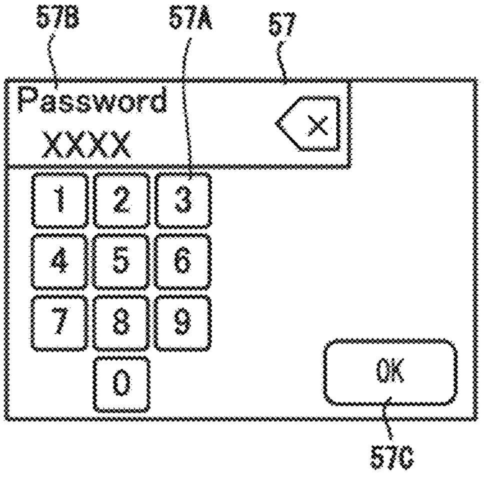
Figure 6:
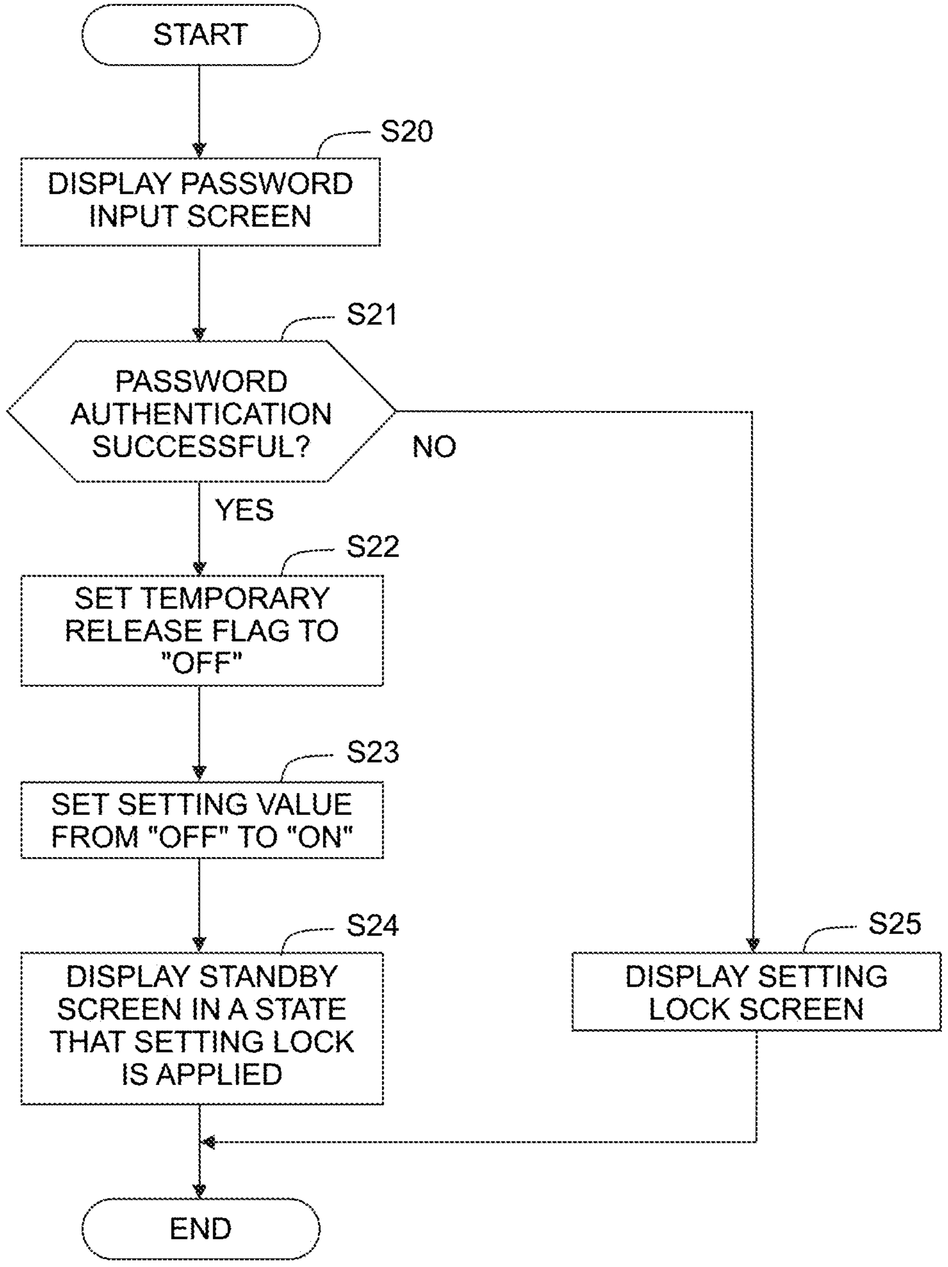
FIG. 6 is a flowchart describing the procedure of a temporary releasing process.

In a case where the user operates the selection icon 56B on the Setting Lockscreen 56, of which display indicates that the setting lock can be changed from "OFF" to "ON", the controller 23 starts a process depicted in FIG. 6. First, the controller 11 causes the user I/F 22 to display a password input screen 57 depicted in FIG. 2E. The password input screen 57 is a screen similar to the password setting screen 55 depicted in FIG. 2C. In a case where the user operates an input key 57A on the password input screen 57 so as to input a password, the input password is displayed in a password display column 57B. In this state, in a case where the user operates an OK button 57C, the controller 23 determines whether the input password matches a setting lock password registered in the lock function setting information 31. In a case where the controller 23 determines that the password authentication has been successful due to a match between the passwords (step S21: YES), the controller 23 proceeds to step S22. Note that in a case where the password entered by the operation on the password input screen 57 does not match the registered setting lock password, the controller 23 determines that password authentication has failed (step S21: NO), proceeds to step S25, and causes the user I/F 22 to re-display the Setting Lock screen 56, which has been already described with reference to FIG. 2D. That is, in this case, since the controller 23 determines that password authentication has failed, the controller 23 does not receive any changes to the setting lock.

By the successful password authentication (step S21: YES), the controller 23 proceeds to step S22 wherein the controller 23 performs initialization by setting the value of the temporary release flag stored in the volatile area of the memory 28 to "OFF". Note that the temporary release flag of the setting lock will be described later. In step S23, the controller 23 changes the setting value of the item "setting lock" registered in the lock function setting information 31 from "OFF" to "ON". In step S24, the controller 23 causes the user I/F 22 to display the standby screen 40 in the state that the setting lock is applied thereto.

Figure 2F:
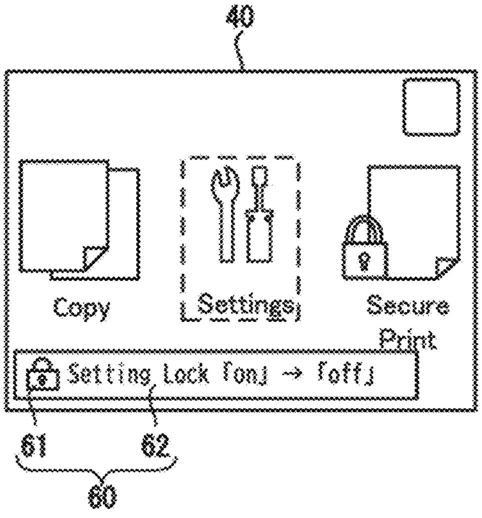

In a state that the setting lock is applied, the controller 23 causes the user I/F 22 to display a lock release icon 60 at a lower part of the standby screen 40, as depicted in FIG. 2F. The lock release icon 60 displayed on the standby screen 40 includes a key mark 61 and a text 62 "Setting Lock on→off" indicating that the setting icon 42 is in the locked state due to the setting lock. Note that the setting lock being applied means a state that the setting value of the item "setting lock" in the lock function setting information 31 is "ON", and includes a case where "the setting icon 42 is in the locked state" and a case where "the lock of the setting icon 42 has been temporarily released, i.e., the setting icon 42 is in a temporarily released state" due to a function of "temporary release of the setting lock" which will be described later. In the present embodiment, the process steps from S20 to S24 are an example of a "locked state-transition process".

In a case where the user operates the setting icon 42 in a state that the controller 23 causes the standby screen 40 to display the lock release icon 60 indicating that the setting icon 42 is in the locked state, the controller 23 proceeds to step S4 because the setting value of the item "setting lock" in the lock function setting information 31 stored in the memory 28 is set to "ON" (step S3: YES).

In step S4, the controller 23 determines whether the temporary release of the setting lock is "ON". The temporary release of the setting lock will be described later. Here, assuming that the temporary release of the setting lock is not applied and is "OFF" (step S4: NO), the controller 23 proceeds to step S5 and performs a process for a case where the setting icon 42 is in the locked state. In the present embodiment, the process for the case where the setting icon 42 is in the locked state is a process of not allowing the user I/F 22 to display the setting menu screen 50 even in a case where the controller 23 detects in step S5 that the setting icon 42 is operated. That is, the display in the user I/F 22 remains the standby screen 40. The process for the case where the setting icon 42 is in the locked state in step S5 may be a process of allowing the user I/F 22 to display the setting menu screen 50 on the user I/F 22 but not receiving an operation with respect to each of the icons on the setting menu screen 50. In this case, the setting menu screen 50 may be displayed in a grayed-out state so as to inform the user that operation with respect to each of the icons on the setting menu screen 50 will not be received.

Next, a function of the temporary release of the setting lock will be described. The MFP 20 has the function of "temporary release of the setting lock" with which, even in a case where the setting icon 42 is in the locked state due to the setting lock, the operation icon 42 is changed to the temporarily released state, that is, the state temporarily released from the locked state, by operating the lock release icon 60 which indicates the "locked state" and which is displayed on the standby screen 40.

In this example, the setting value of the item "setting lock" of the lock function setting information 31 is assumed to already have been set to apply "ON" by the process described with reference to FIG. 5. FIG. 7 is a diagram describing the transition of the screens displayed on the user I/F 22 in a state that the setting lock is set to "ON".

Figure 7A:
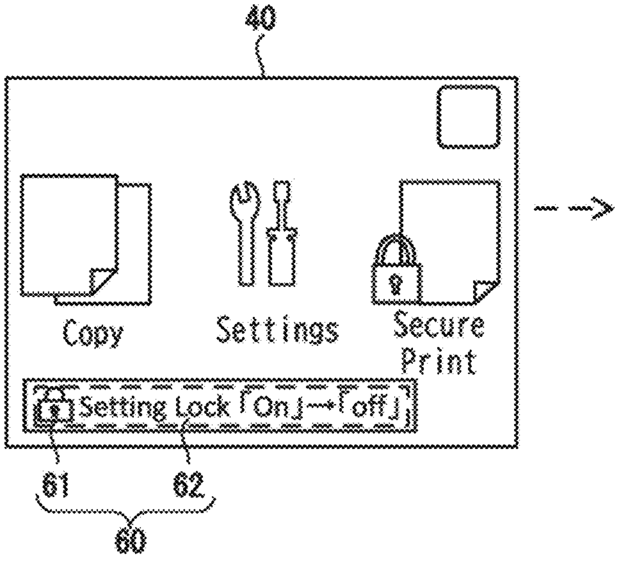
FIGS. 7A to 7C are diagrams depicting transition of screens displayed on a user I/F.
Figure 7B:
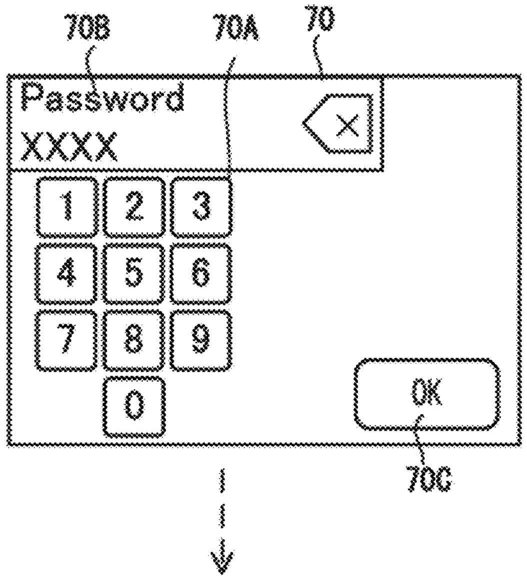
Figure 7C:
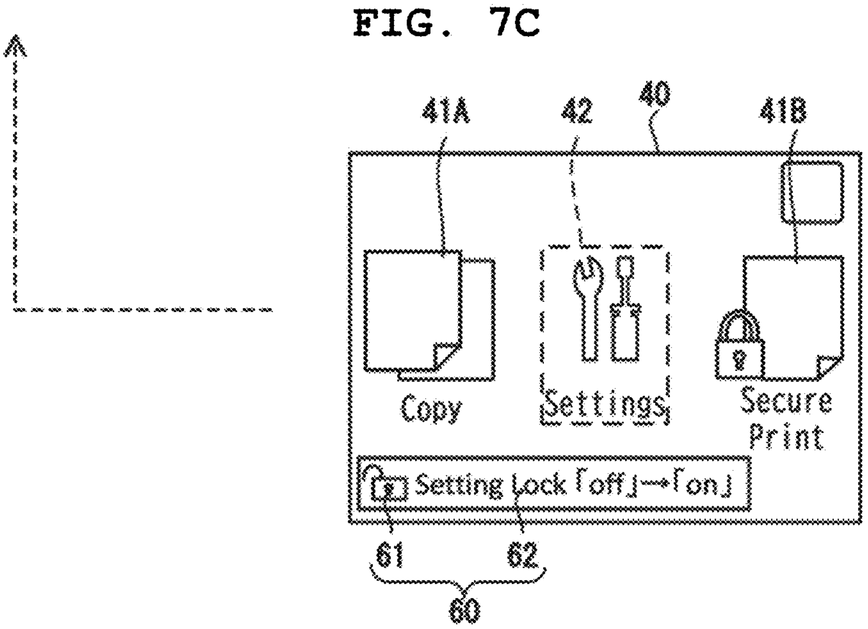
Figure 8:
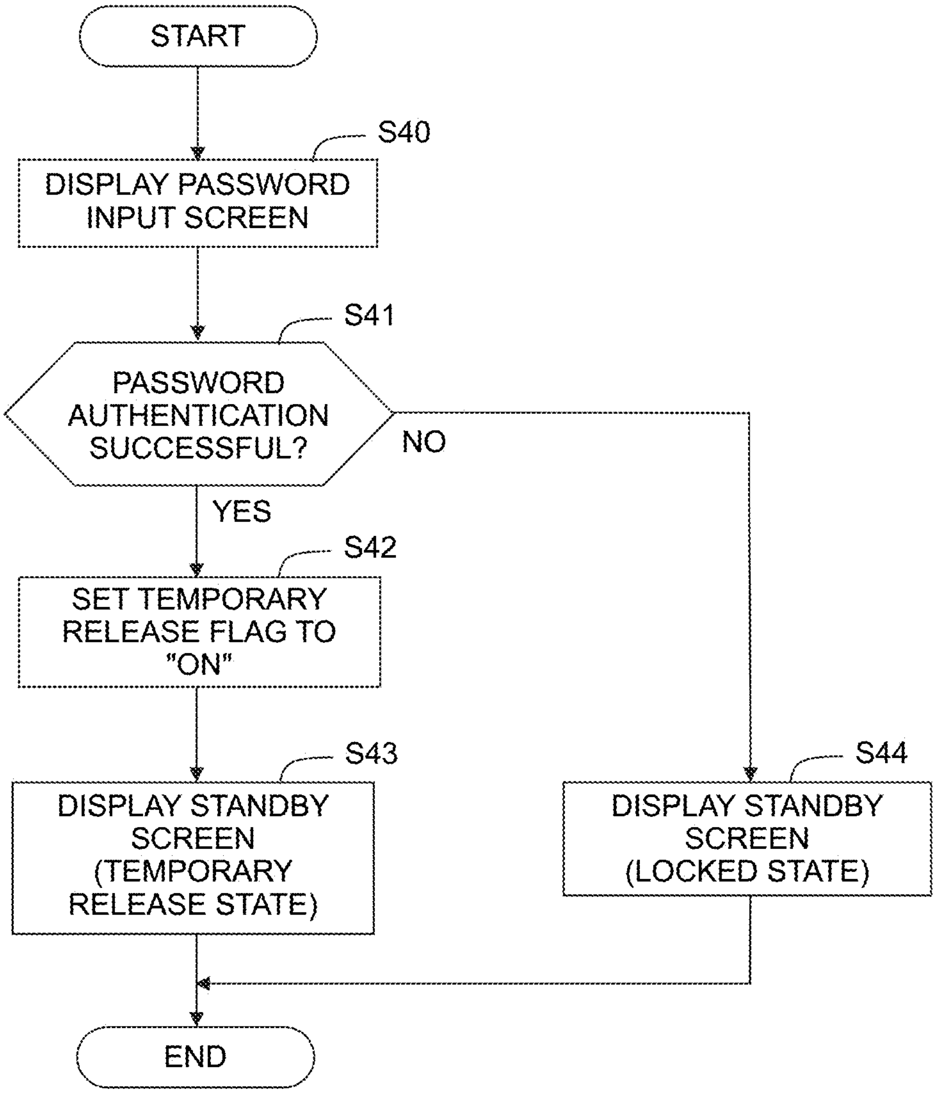
FIG. 8 is a flowchart describing changing of a setting value of the temporary releasing process.

First, the setting of the temporary release of the setting lock will be described. In FIGS. 7A to 7C, for convenience sake, the standby screen 40 in the state that the setting lock is applied is depicted as FIG. 7A. FIG. 7A is a screen which is the same as the screen depicted in FIG. 2F. In a case where the controller 23 detects that the lock release icon 60 included in the standby screen 40 has been operated in a state that the application of the setting lock is set to "ON", the controller 23 starts a process depicted in FIG. 8. Note that the operation on the lock release icon 60 may be a single touch, or may be an operation different from the single touch, such as a swipe.

In step S40, the controller 23 causes the user I/F 22 to display a password input screen 70 depicted in FIG. 7B. The password input screen 70 is a screen similar to the password setting screen 55 depicted in FIG. 2C. In a case where the user operates an input key 70A of the password input screen 70 so as to input the password, the input password is displayed in a password display column 70B. In a case where the user operates an OK button 70C in this state, and in a case where the input password matches the setting lock password registered in the lock function setting information 31, the controller 23 determines that the password authentication has been successful (step S41: YES) and proceeds to step S42. Note that in a case where the password input by the operation on the password input screen 70 does not match the registered setting lock password (step S41: NO), the controller 23 proceeds to step S44 and causes the user I/F 22 to re-display the standby screen 40 depicted in FIG. 7C. In other words, in this case, since the controller 23 determines that password authentication has failed, the controller 23 does not receive the change of setting of the temporary release of the setting lock.

In a case where the controller 23 proceeds to step S42, the controller 23 sets the value of the temporary release flag stored in the volatile area of the memory 28 to "ON". Note that the setting value of the item "setting lock" of the lock function setting information 31 remains "ON". Further, the controller 23 proceeds to step S43 and causes the user I/F 22 to display the standby screen 40 depicted in FIG. 7C. In the standby screen 40 depicted in FIG. 7C, the aspect of display of the lock release icon 60 has changed to an aspect of display which temporarily releases the lock of the setting icon 42 (i.e., an aspect of display which indicates the temporarily released state), as compared to the lock release icon 60 depicted in FIG. 7A. Specifically, the aspect of display of the key mark 61 becomes "unlocked state" and the text 62 is changed from "Setting Lock off→on" so that the lock of the setting icon 42 thereby indicates the temporarily released state. By making the display aspect of the locked state of the setting icon 42 different from the display aspect of the temporarily released state of the setting icon 42, the user can visually determine whether the setting icon 42 is in the locked state or the temporarily released state. In the present embodiment, the lock release icon 60 displayed in the temporarily released state is an example of a "re-lock icon".

Note that a state that the controller 23 causes the user I/F 22 to display, on the standby screen 40, the lock release icon 60 indicating that the setting icon 42 is in the temporarily released state (step S1: YES), the controller 23 proceeds to step S4 because the setting value of the item "setting lock" of the lock function setting information 31 is set to "ON" (step S3: YES). In this example, since the temporary release of the setting lock is set to "ON" in step S4 (step S4: YES), the controller 23 proceeds to step S6, similarly to the case where the setting lock "ON" is not applied, and the controller 23 causes the user I/F 22 to display the setting menu screen 50 depicted in FIG. 2B.

In the setting menu screen 50 displayed in the temporarily released state, each of the icons in FIG. 2B may include an icon which can be operated in a case where the setting lock is not applied but cannot be operated in the temporarily released state. The icons depicted in FIG. 2B may include an icon which is displayed in a case where the setting lock is not applied but is not displayed in the temporarily released state.

Figure 9:
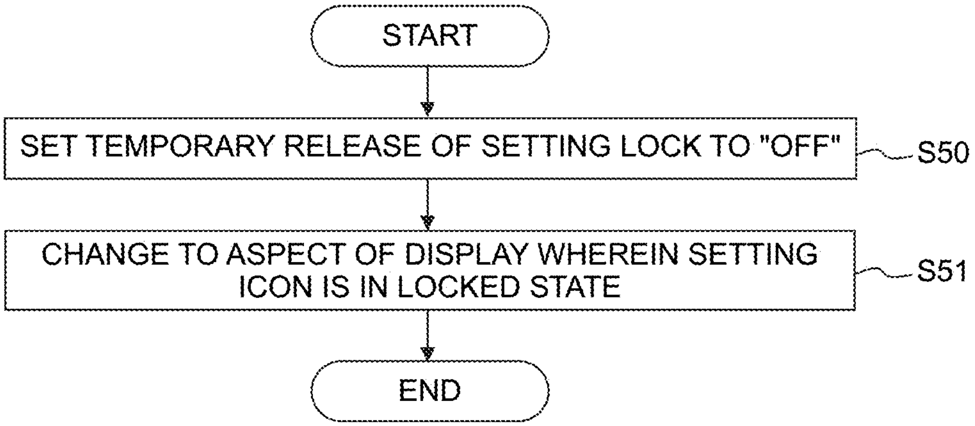
FIG. 9 is a flowchart describing the changing of the setting value of the temporary releasing process.

Next, with reference to FIG. 9, a process will be described which is performed in a case where the user operates the lock release icon 60 indicating the locked state to thereby temporarily release the lock of the setting icon 42 and then the controller 23 causes the setting icon 42 to be in the locked state again by a manual operation performed by the user. In a case where the controller 23 detects that the user operates the lock release icon 60 indicating the temporarily released state after the setting icon 42 has been in the temporarily released state as depicted in FIG. 7C, the controller 23 sets, in step S50, the temporary release flag stored in the volatile area of the memory 28 to the value indicating that the temporary release of the setting lock is "OFF".

In step S51, the controller 23 changes the aspect of display of each of the key mark 61 and the text 62 of the lock release icon 60 included in the standby screen 40 from the aspect of display indicating that the lock of the setting icon 42 has been temporarily released to the aspect of display indicating that the setting icon 42 is in the locked state. Specifically, as depicted in FIG. 7A, the aspect of display of the key mark 61 in the lock release icon 60 is changed to a "locked-in state", and the aspect of display of the text 62 is changed to "Setting Lock off→on".

Figure 10:
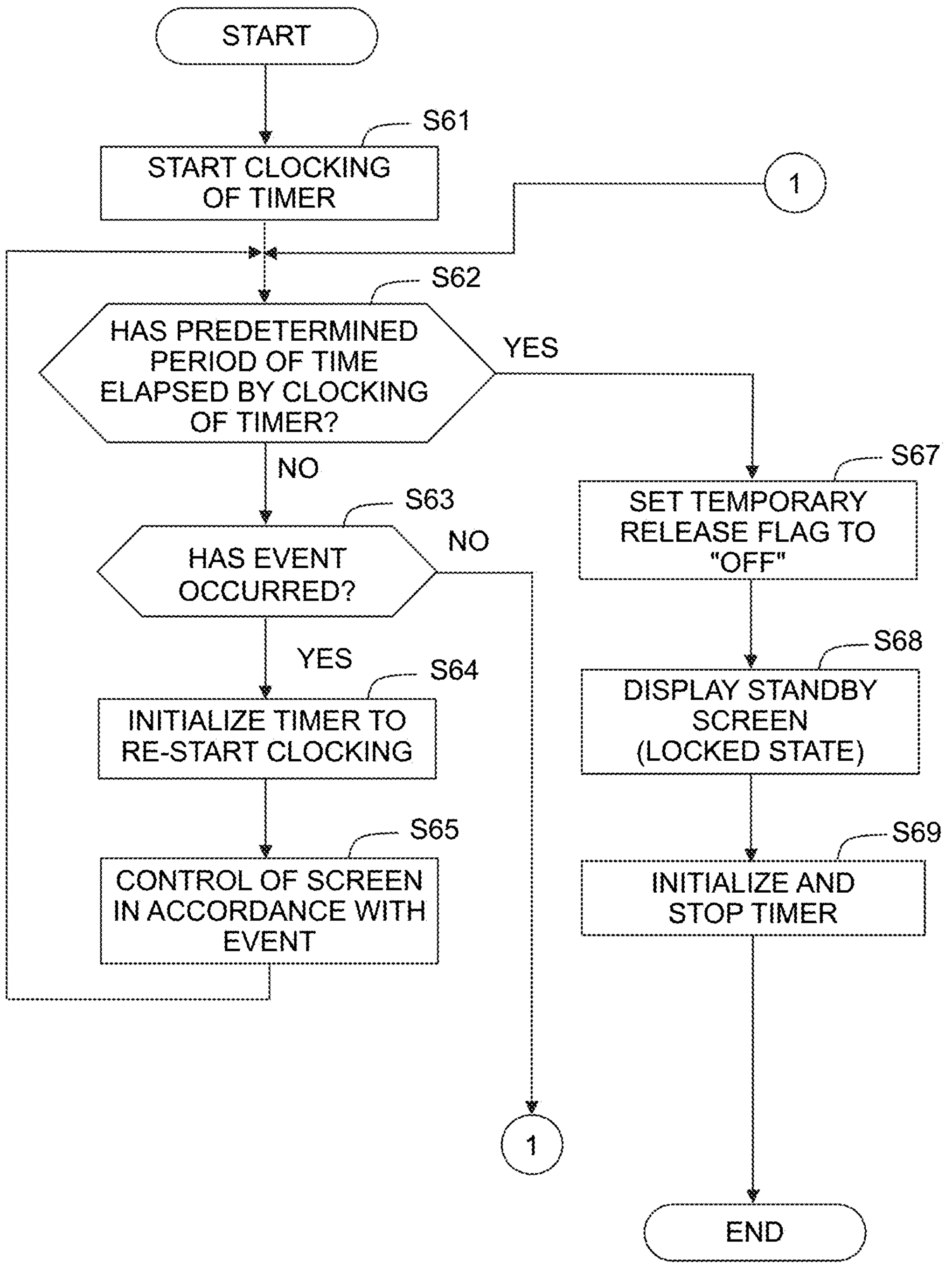
FIG. 10 is a flowchart describing the procedure of a process performed in a case where the temporarily released state is to be released.

Next, with reference to FIG. 10, a process will be described which is performed in a case where the user operates the lock release icon 60 indicating the locked state to thereby temporarily cause the setting icon 42 to be in the temporarily released state and then the controller 23 causes the setting icon 42 to automatically transition to the locked state with the lapse of time.

First, in a case where the operation of temporarily releasing the locked state of the setting icon 42 is performed, the controller 23 detects the operation of the lock release icon 60 indicating the locked state, and activates a timer to start clocking in step S61. In step S62, the controller 23 determines whether a predetermined time (e.g., one minute) has elapsed based on the clocking of the timer. In a case where the controller 23 determines that the predetermined time has not elapsed (step S62: NO), the controller 23 proceeds to step S63 and determines whether an event in accordance with an operation on the currently displayed screen has occurred.

In a case where the controller 23 determines that no event has occurred (step S63: NO), the controller 23 returns to step S62. In a case where the controller 23 determines that the predetermined time has elapsed, based on the timer count, without an event occurring (step S62: YES), the controller 23 proceeds to step S67 wherein the controller 23 changes the temporary release flag stored in the volatile area of the memory 28 to "OFF" indicating the release from the temporarily released state. Note that the setting value of the item "setting lock" in the lock function setting information 31 remains "ON".

The controller 23 proceeds to step S68 and causes the user I/F 22 to re-display the standby screen 40 in the locked state as depicted in FIG. 7A. As a result, the lock release icon 60, which indicates that the setting icon 42 is in the locked state, is displayed on the standby screen 40. In a case where the setting icon 42 is operated in this state (step S1: YES in FIG. 3), since the setting value of the item "setting lock" in the lock function setting information 31 remains "ON" (step S3: YES) and the temporary release flag is "OFF" (step S4: NO), thus the controller 23 proceeds to step S5 and performs the process for the case where the setting icon is in the locked state, as already described above. In other words, the setting icon 42 is automatically returned to the locked state in response to the lapse of the predetermined time after the setting icon 42 has been in the temporarily released state.

In step S69, the controller 23 initializes the clocking of the timer and stops the timer. After completing the process of step S69, the controller 23 ends the process of FIG. 10. Also in this state, the user can surely swipe the lock release icon 60 to thereby set the setting icon 42 to the temporarily released state again so as to enable the operation of the setting icon 42.

On the other hand, in a case where the controller 23 detects the occurrence of the event in step S63 (step S63: YES), the controller 23 proceeds to step S64, initializes the clocking of the timer, and restarts clocking of the predetermined time. That is, the controller 23 restarts the clocking of the timer from the beginning, thereby extending a period of time since when the setting icon 42 has been in the temporarily released state until the setting icon 42 is automatically returned to the locked state.

In step S65, the controller 23 controls the screen in accordance with the process in accordance with the event which has occurred. The controller 23 returns to step S62 and determines whether the predetermined period of time has elapsed based on the clocking of the timer. That is, each time an event such as the operation of an icon, transition of the screens, reception of job data, etc., occurs with respect to the currently displayed screen (step S63: YES), the controller 23 initializes the clocking of the timer in step S64, thereby extending the temporary release state of the setting icon 42.

Examples of the event detected by the controller 23 include a user operating the user I/F 22, receipt of a print job including image data from the PC 10, and transition of the currently displayed screen to another screen due to the operation by the user. In a situation where an event occurs and a process associated with an operation of the setting screen, etc., is expected to take a long time, the setting icon 42 being returned to the locked state is presumably a great inconvenience for the user. Therefore, in a case where an event occurs, the locked setting icon 42 is temporarily unlocked, and then the time until the setting icon 42 is returned to the locked state is extended, thereby improving the convenience for the user.

In a case where the controller 23 determines from the clocking of the timer that the extended time has elapsed (step S62: YES), the controller 23 changes the temporary release flag stored in the volatile area of the memory 28 to "OFF" in step S67, as already described above; in step S68, the controller 23 causes the user I/F 22 to re-display the standby screen 40 indicating that the setting icon 42 is in the locked state. The controller 23 initializes the clocking of the timer and stops the timer in step S69, and ends the process in FIG. 9.

In the present embodiment described above, the following effects can be achieved.

In a case where the setting icon 42 is in the locked state and the temporarily releasing operation is performed so as to temporarily release the locked state, the controller 23 causes the setting icon 42 of the user I/F 22 to be in the temporarily released state in which the controller 23 allows the user I/F 22 to display the setting screen. In a case where the temporarily released state has continued for the predetermined period of time, the controller 23 is triggered to release the temporarily released state and returns the setting icon 42 of the user I/F 22 to the locked state. This makes it possible to perform the display and the non-display of the setting screen on the user I/F 22 in the locked state, without forcing the user to perform any complicated operation.

In a case where the temporarily released state has continued for the predetermined period of time while the standby screen 40 is being displayed, the controller 23 is triggered to release the temporarily released state of the setting icon 42 of the user I/F 22 and returns the setting icon 42 to the locked state. With this, only in a case where the standby screen 40 is displayed and in a case where the temporary release state of the setting icon 42 has continued for the predetermined period of time, the controller 23 is triggered to return the setting icon 42 of the user I/F 22 from the temporarily released state to the locked state, thereby enabling prevention of the locked state from being released unnecessarily.

In a case where an event in which the user I/F 22 is operated or an event in which the image data is received occurs while the standby screen 40 is displayed during the temporarily released state of the setting icon 42, the controller 23 extends a period of time since when the occurrence of the temporarily released state of the setting icon 42 until the release of the temporarily released state, as compared to a case where no event occurs. With this, in the case where the event occurs, the period of time until the temporarily released state of the setting icon 42 is released is extended, thereby increasing the convenience for the user.

In a case where an event involving the transition of the screens occurs in the state that the standby screen 40 is displayed while the setting icon 42 is temporarily released, the controller 23 extends the period of time since the occurrence of the temporarily released state of the setting icon 42 until the release of the temporary release, as compared to the case where no event occurs. With this, in the case where the event involving the transition of the screens occurs, the period of time until the temporarily released state of the setting icon 42 is released is extended, thereby increasing the convenience for the user.

In a case where the temporarily releasing operation, which is the operation of the lock release icon 60, is performed in the locked state of the setting icon 42, the controller 23 causes the setting icon 42 to be in the temporarily released state. In the temporarily released state, the controller 23 causes the user I/F 22 to display the lock release icon 60 (re-lock icon) indicating the temporarily released state; in the case where the lock release icon 60 is operated, the controller 23 is triggered to release the temporary release of the lock on the setting icon 42. With this, by making the aspect of display of the locked state of the setting icon 42 different from the aspect of display of temporarily released state of the setting icon 42, the user can visually determine whether the setting icon 42 is in the locked state or the temporarily released state.

The controller 23 prompts the user to input the setting lock password together with the operation of the lock release icon 60 in the locked state of setting icon 42, and the controller 23 causes the setting icon 42 to transition to the temporarily released state in the case where the setting lock password is input. With this, the security with respect to the MFP 20 can be prevented from being excessively reduced.

Second Embodiment

In a second embodiment of the present disclosure, a configuration different from the configuration of the first embodiment will be mainly described. In the second embodiment, a same component as the component in the first embodiment is denoted by the same reference numeral, and the description thereof will not be repeated.

FIGS. 11A to 11G are diagrams of describing the transition of screens displayed on a user I/F 22 according to the second embodiment. In the second embodiment, similarly to the above-described description regarding the first embodiment, the controller 23 can perform various settings with respect to the setting lock by an operation with respect to a standby screen 80 displayed on the user I/F 22. On the other hand, in the second embodiment, the various settings with respect to the setting lock can be set by an administrator operation which is an operation performed by an administrator of the MFP 20 after the administrator performs administrator login. Further, the setting lock can be set individually for each of selection icons in a setting menu screen "All Settings" 98 displayed by an operation of a setting icon 82 which will be described later. In other words, the setting lock may be paraphrased as being settable individually for each of the setting screens corresponding to one of the selection icons in the setting menu screen "All Settings" 98. In other words, since setting screens each of which corresponds to one of functions included in the MFP 20 are included in the setting screens corresponding to the selection icons in the setting menu screen "All Settings" 98, the setting lock may be paraphrased as being settable individually for each of the functions included in the MFP 20.

Figure 11A:
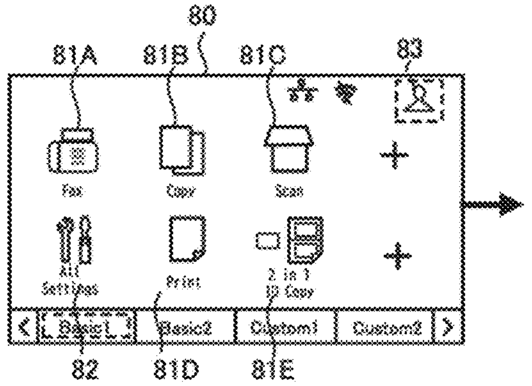
FIGS. 11A to 11G are diagrams depicting transition of screens displayed on a user I/F according to a second embodiment.

As depicted in FIG. 11A, the standby screen 80 includes operation icons 81A, 81B, 81C, 81D and 81E corresponding to the various functions included in the MFP 20, and a setting icon 82. The setting screen displayed on the standby screen 80 by operations with respect to each of the operation icons 81A to 81E is the same as the setting screen in the first embodiment. Further, the standby screen 80 includes an administrator setting icon 83 which is operated in a case where a login operation by the administrator is received.

Figure 11B:
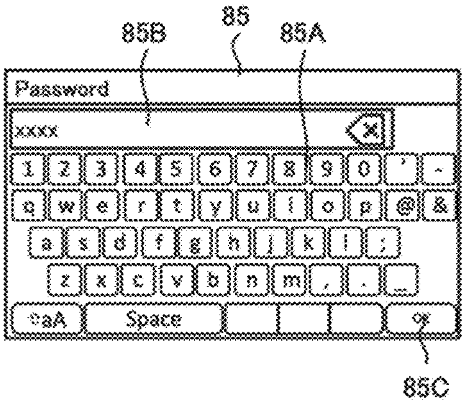
Figure 11C:
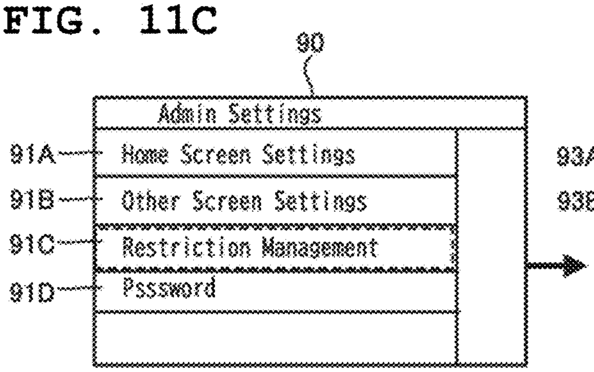
Figure 12:
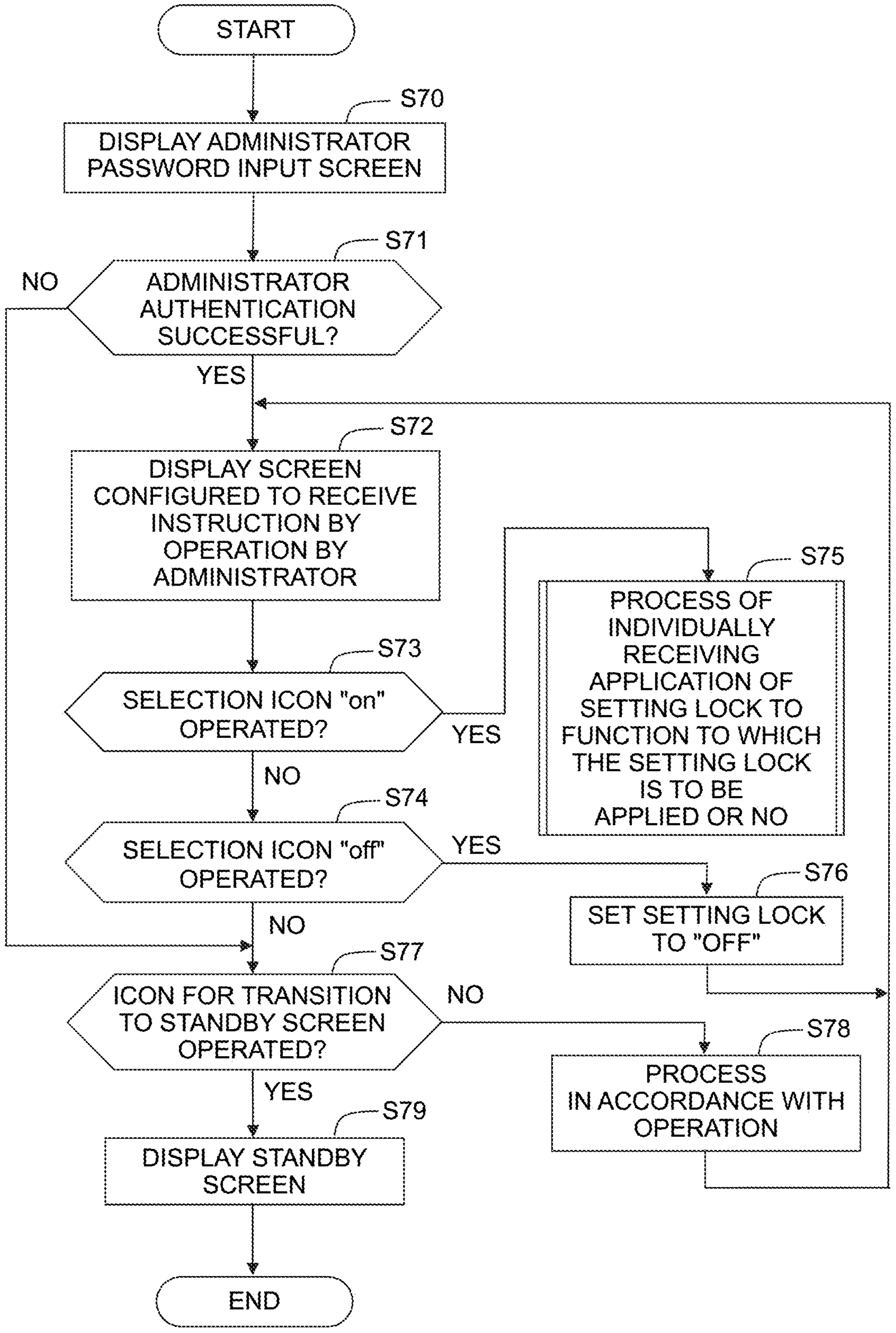
FIG. 12 is a flowchart describing the procedure of a process of changing the setting value of a lock function.

In a case where the administrator operates the administrator setting icon 83 on the standby screen 80, the controller 23 detects the operation of the administrator setting icon 83 and starts a process depicted in FIG. 12. First, in step S70, the controller 23 causes the user I/F 22 to display an administrator password input screen 85 configured to receive input of an administrator password, as depicted in FIG. 11B. In a case where the administrator operates the input key 85A so as to input the administrator password and operates an OK button 85C, the controller 23 determines in step S71 whether the administrator authentication has been successful. Specifically, the controller 23 determines that the administrator authentication has been successful in a case where the password input by the administrator matches the administrator password registered in the memory 28. The administrator password is a password for authenticating that an operator operating the MFP 20 is the administrator, and is not a password exclusive for the lock function such as the setting lock password of the first embodiment. In the second embodiment, the controller 23 authenticates that the user is the administrator, and then the controller 23 prompts the operator to input the administrator password in a scene where a specific process is to be executed, similarly to step S70 and step S71, in addition to a case where the controller 23 detects the operation of the administrator setting icon 83. Also in the above-described first embodiment, the controller 23 may perform the authentication with the administrator password, rather than the setting lock password, in step S20 and step S21 of FIG. 6 and in step S40 and step S41 of FIG. 8.

In a case where the controller 23 determines that the administrator authentication has been successful (step S71: YES), the controller 23 proceeds to step S72 and causes the user I/F 22 to display a screen configured to receive an instruction by the operation by the administrator. In a case where the controller 23 determines that the administrator authentication has failed (step S71: NO), the controller 23 does not cause the user I/F 22 to display the screen configured to receive the instruction by the operation by the administrator. In a case where the controller 23 causes the user I/F 22 to display the screen configured to receive the instruction by the operation by the administrator, the controller 23 first causes the user I/F 22 to display an administrator menu screen 90 depicted in FIG. 11C. The administrator menu screen 90 is a screen which includes selection icons 91A to 91D each of which corresponds to one of various menu screens which are associated as lower-order layers of the administrator menu screen 90. In a case where the user operates any one the selection icons 91A to 91D, the controller 23 causes the user I/F 22 to display a screen which corresponds to the operated selection icon among the selection icon 91A to 91D. The administrator menu screen 90 depicted in FIG. 11C includes a selection icon "Home Screen Settings" 91A which is selected and operated in a case where setting related to the display of the standby screen 80 is made, a selection icon "Other Screen Settings" 91B which is selected and operated in a case where setting related to displays other than the standby screen 80 is made, a selection icon "Restriction Management" 91C which is selected and operated in a case where setting related to various restrictions for registered user(s) registered in the MFP 20 is made, and a selection icon "Password" 91D which is selected and operated in a case where setting related to the administrator password is made.

Figure 11D:
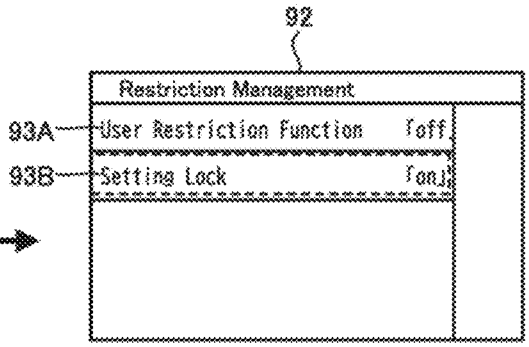

In a case where the administrator operates the selection icon "Restriction Management" 91C, the controller 23 causes the user I/F 22 to display a restriction setting screen 92 depicted in FIG. 11D. The restriction setting screen 92 includes a selection icon "User Restriction Function" 93A which is operated in a case where permission to execute the various functions of the MFP 20 and the restriction of the various functions of the MFP 20 are set with respect to a specified user, and a selection icon "Setting Lock" 93B which is operated in a case where setting related to the setting lock is performed.

Figure 11E:
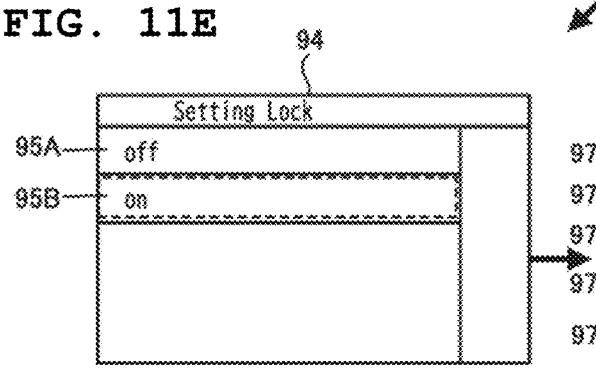
Figure 11F:
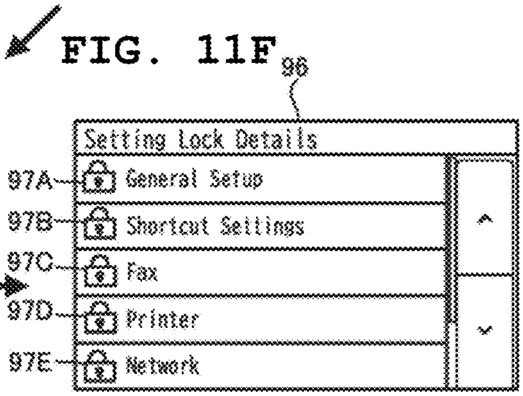

In a case where the user operates the selection icon "Setting Lock" 93B on the restriction setting screen 92, the controller 23 causes the user I/F 22 to display a Setting Lock Display screen 94 as depicted in FIG. 11E. The Setting Lock screen 94 includes a selection icon "off" 95A configured to receive an instruction "OFF" indicating that the setting lock is not to be applied to the MFP 20, and a selection icon "on" 95B configured to receive an instruction "ON" indicating that the setting lock is to be applied to the MFP 20. In a case where the user operates the selection icon "off" 95A, an instruction for not applying the setting lock is given to the controller 23, whereas in a case where the user operates the selection icon "on" 95B, an instruction for applying the setting lock is given to the controller 23.

Figure 13:
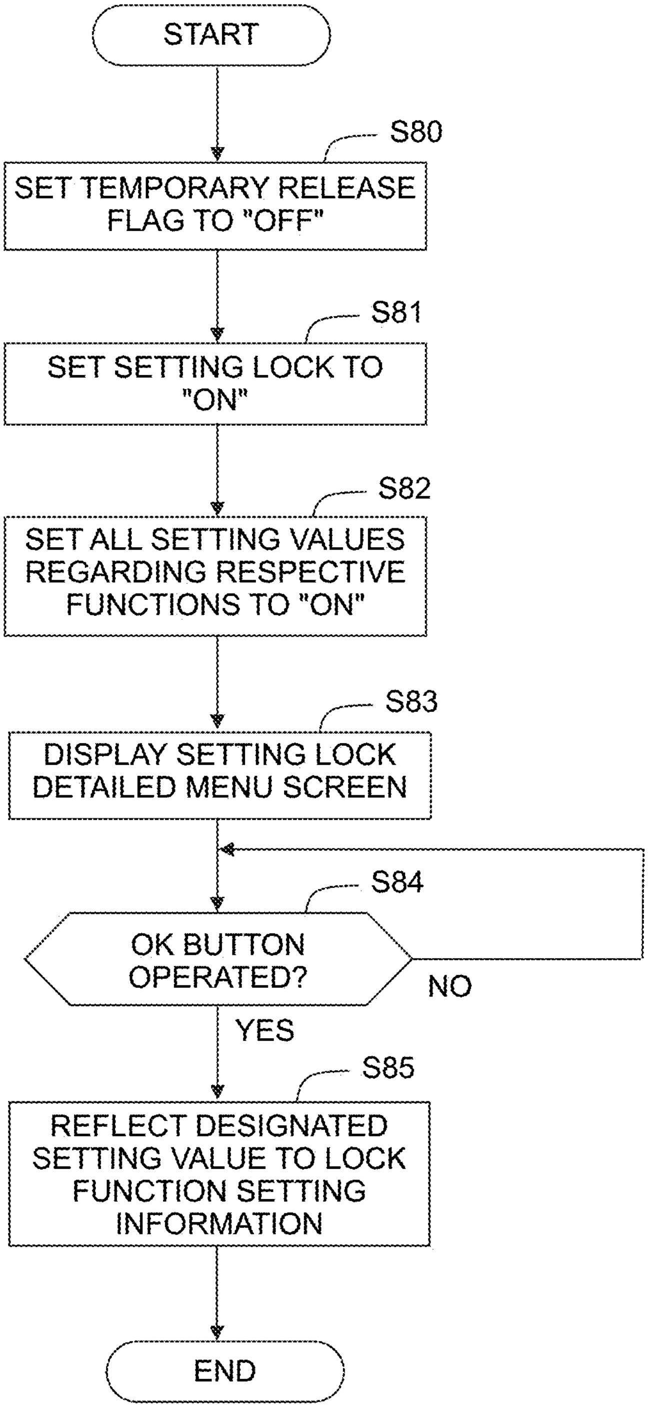
FIG. 13 is a flowchart describing the procedure of a process executed in step S75 of FIG. 12.

In a case where the controller 23 detects the operation of the selection icon "on" 95B by the administrator (step S73: YES), the controller 23 proceeds to step S75, and executes a process for individually receiving the application of the setting lock to a function to which the setting lock is to be applied. The process executed by the controller 23 in step S75 will be described with reference to FIG. 13. In step S80, the controller 23 sets the value of the temporary release flag stored in the volatile area of the memory 28 to "OFF". The controller 23 prepares lock function setting information 35 in the volatile area of the memory 28. Specifically, in step S81, the controller 23 sets a setting value of an item "setting lock" of the lock function setting information 35 to "ON". The item "setting lock" of the lock function setting information 35 is an item similar to the item "setting lock" of the lock function setting information 31. As will be described later, the lock function setting information 35 prepared in the volatile area is stored in the non-volatile area of the memory 28 in step S85.

FIG. 14 is a diagram describing the lock function setting information 35 according to the second embodiment. The lock function setting information 35 includes an item "setting lock" configured to register a setting value set in accordance with an operation with respect to the selection icon "off" 95A and the selection icon "on" 95B of the Setting Lock screen 94. Further, the lock function setting information 35 includes items "General Setup Lock", "Shortcut Setting Lock", "Fax Lock", "Network Lock", . . . "xxxx" indicating whether a lock is applied or not to each of the functions of the MFP 20. The setting value of each of the items "General Setup Lock", "Shortcut Setting Lick", "Fax Lock", "Network Lock", . . . "xxxx" is registered as either "ON" indicating that the setting lock is applied to the corresponding function or "OFF" indicating that the setting lock is not applied to the corresponding function. As described above, the lock with respect to each of the functions may be rephrased as the lock with respect to each of the selection icons in the setting menu screen "All Settings" 98. The lock with respect to each of the functions may be rephrased as the lock with respect to each of the setting screens corresponding to one of the selection icons in the setting menu screen "All Settings" 98.

In step S82, the controller 23 performs initialization with respect to the lock function setting information 35 in the volatile area of the memory 28 by setting the setting values of the respective items to "ON". In step S83, the controller 23 causes the user I/F 22 to display a setting lock detailed menu screen 96 depicted in FIG. 11F by using each of the setting values of the lock function setting information 35 expanded in the volatile area of the memory 28 and initialized in step S82. The setting lock detailed menu screen 96 is a screen capable of receiving the setting instruction of "ON" for applying the setting lock, or the setting instruction of "OFF" for not applying the setting lock, with respect to each of the functions to which the setting lock is to be applied or not. The setting lock detailed menu screen 96 includes selection icons 97A to 97E which correspond to all the functions of which items are registered in the lock function setting information 35. Specifically, the setting lock detailed menu screen 96 includes a selection icon 97A corresponding to a function "General Setup", a selection icon 97B corresponding to a function "Shortcut Settings", a selection icon 97C corresponding to a function "Fax", a selection icon 97D corresponding to a function "Printer", and a selection icon 97E corresponding to a function "Network".

Each of the selection icons 97A to 97E includes a key mark which indicates whether the setting lock is applied or not. In a case where the key mark indicates a locked-in state, the key mark indicates that the setting lock is applied "ON" with respect to the corresponding function.

In a case where the administrator operates any one of the selection icons 97A to 97E wherein the key mark is in the locked-in state on the setting lock detailed menu screen 96, the controller 23 changes the key mark from the locked-in state to the unlocked state. Note that the key mark indicating the unlocked state indicates that "OFF" is specified by which the setting lock is not applied to the corresponding function. In a case where the administrator operates any one of the selection icons 97A to 97E wherein the key mark is in the unlocked state on the setting lock detailed menu screen 96, the controller 23 changes the key mark from the unlocked state to the locked-in state. Further, in a case where the administrator operates the OK button (not depicted) on the setting lock detailed menu screen 96 so as to confirm the instruction with respect to each of the selection icons 97A to 97E, the controller 23 detects the operation of the OK button (step S84: YES), the controller 23 proceeds to step S85, and the controller 23 causes the volatile memory 28 to store, in the volatile area of the memory 28, the lock function setting information 35, i.e., the lock function setting information 35 wherein the setting value of the item "setting lock" is set to "ON", the operation with respect to each of the selection icons 97A to 97E is reflected, and the setting value of each of the items "General Setup lock", "Shortcut Settings lock", "Fax lock", "Network lock", . . . "xxxx" is set to "ON" or "OFF". Further, the controller 23 ends the process of step S75 and then returns to step S72.

On the other hand, in a case where the administrator operates the selection icon "off" 95A without operating the selection icon "on" 95B (step S73: NO), the controller 23 detects the operation of the selection icon "off" 95A (step S74: YES) and proceeds to step S76. In step S76, the controller 23 sets the setting value of the item "setting lock" of the lock function setting information 35 to "OFF" and returns to step S72. That is, in a case where the selection icon "off" 95A is operated, unlike in a case where the selection icon "on" 95B is operated, the setting lock is set such that the setting lock is not applied collectively to all the functions to which the setting lock is to be applied or not.

In a case where the administrator operates, for example, any one of the selection icons 91A to 91D displayed on the administrator menu screen 90, the administrator operates an icon other than the selection icon "off" 95A and the selection icon "on" 95B, and thus the controller 23 detects the operation of a selected icon (step S77: NO), the controller 23 proceeds to step S78 and executes a process in accordance with the operated icon. In a case where the controller 23 detects that an icon for causing the screen displayed on the user I/F 22 to transition to the standby screen 80 has been operated (step S77: YES), the controller 23 proceeds to step S79, and causes the user I/F 22 to display the standby screen 80 depicted in FIG. 11A or FIG. 11G, in accordance with the setting value of the item "setting lock" of the lock function setting information 35.

Figure 11G:
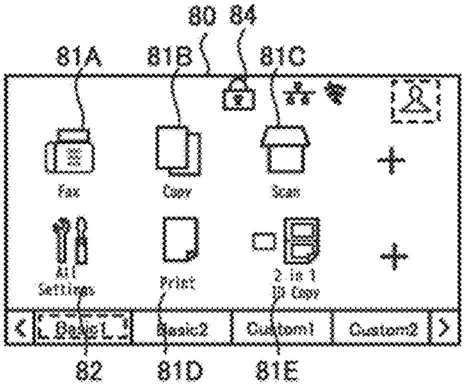

The standby screen 80 depicted in FIG. 11G is a screen in a case where the setting value of the item "setting lock" of the lock function setting information 35 is "ON" and the locked state is applied to setting icon 82. A lock temporary release icon 84 is displayed at an upper part of the standby screen 80. The lock temporary release icon 84 is in the aspect of display of the locked-in state indicating that the locked state has been applied to the MFP 20. Similarly to the first embodiment, the lock temporary release icon 84 changes between the aspect of display indicating the locked state and the aspect of display indicating the temporarily released state, depending on the temporarily releasing operation by the user.

Figure 15:
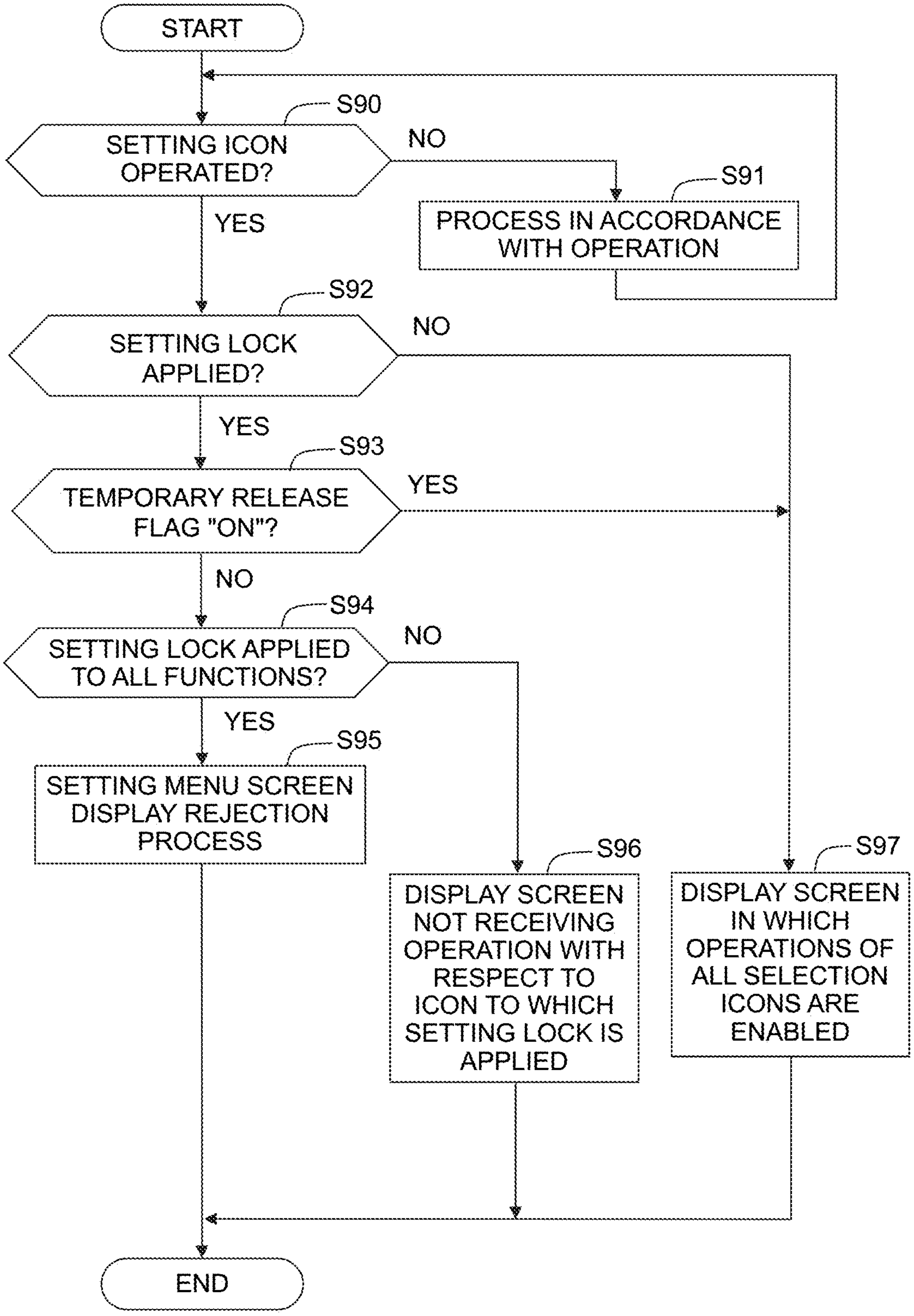
FIG. 15 is a flowchart describing the procedure of a process which is executed in response to an operation on a standby screen.

Next, with reference to FIG. 15 a process will be described which is executed in the second embodiment, in response to an operation of any one of the icons on the standby screen 80 by a user different from the administrator. In a case where the controller 23 detects the operation of any one of the icons with respect to the standby screen 80, the controller 23 executes a procedure of a flowchart depicted in FIG. 15. First, in step S90, the controller 23 determines whether the operated icon is the setting icon 82. In a case where the controller 23 determines that the operated icon is an icon other than the setting icon 82 (step S90: NO), the controller 23 proceeds to step S91 and executes a process in accordance with the operated icon. After executing the process, the controller 23 returns the screen displayed on the user I/F 22 to the standby screen 40. Note that, after executing the process, in a case where a predetermined operation is performed, the controller 23 may return the screen displayed on the user I/F 22 to the standby screen 40.

On the other hand, in a case where the controller 23 determines in step S90 that the operated icon is the setting icon 82 (step S90: YES), the controller 23 proceeds to step S92 and determines whether the setting lock has been applied to the MFP 20 or not. Specifically, the controller 23 refers to the lock function setting information 35 stored in the memory 28. The lock function setting information 35 has already been described. Here, in a case where the setting value of the item "setting lock" in the lock function setting information 35 indicates "OFF" (step S92: NO), the controller 23 proceeds to step S97 and causes the user I/F 22 to display the setting menu screen which is displayed in response to the operation of the setting icon 82.

Figure 16A:
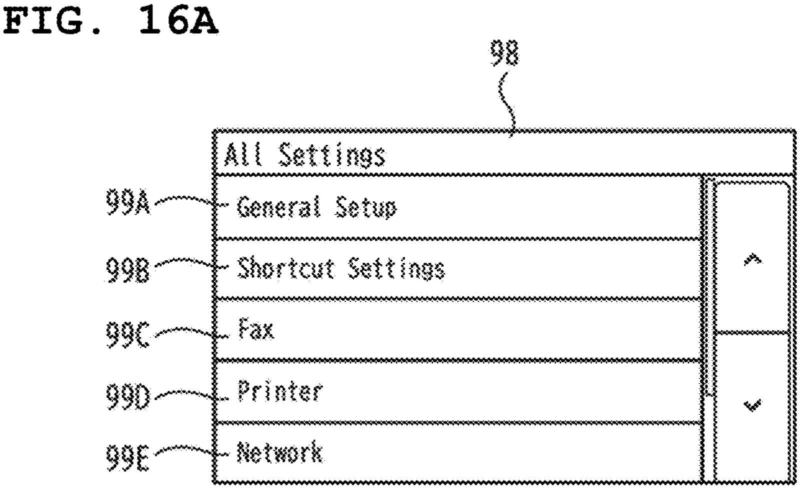
FIGS. 16A to 16C are figures describing a setting screen which changes depending on whether a setting lock is applied or not.

In the second embodiment, the controller 23 causes the user I/F 22 to display the setting menu screen "All Settings" 98 depicted in FIG. 16A, by the operation of the setting icon 82. The setting menu screen "All Settings" 98 includes selection icons 99A to 99E each of which is configured to receive an operation for displaying a setting screen for one of the functions of the MFP 20. Note that the selection icons 99A to 99E correspond to the functions registered in the lock function setting information 35, and include the selection icon 99A configured to receive an operation for displaying a setting screen of a function "General Setup", the selection icon 99B configured to receive an operation for displaying a setting screen of a function "Shortcut Settings", the selection icon 99C configured to receive an operation for displaying a setting screen of a function "Fax", the selection icon 99D configured to receive an operation for displaying a setting screen of a function "Printer", and the selection icon 99E configured to receive an operation for displaying a setting screen of a function "Network". In a case where any one of the selection icons 99A to 99E is operated, the controller 23 causes the user I/F 22 to display a setting screen corresponding to the operated selection icon, i.e., a setting screen regarding the function corresponding to the operated selection icon. Further, in accordance with the operation via the displayed setting screen, the controller 23 sets a setting value for each of the functions corresponding to the setting screens. After setting the setting value, the controller 23 returns the screen displayed on the user I/F 22 to the standby screen 40. Note that the controller 23 may return the screen displayed on the user I/F 22 to the standby screen 40 in a case where a predetermined operation is performed on the setting screen.

On the other hand, in a case where the setting value of the item "setting lock" is set to "ON" in the lock function setting information 35 stored in the memory 28 (step S92: YES), the controller 23 proceeds to step S93. In step S93, the controller 23 determines whether the temporary release flag stored in the volatile area of the memory 28 is set to ON. Note that, in the second embodiment, a process for applying the temporary release of the setting lock to the setting icon 82 by setting the temporary release flag from "OFF" to "ON" will be described later. In a case where the temporary release flag is set to ON (step S93: YES), the controller 23 proceeds to step S97, and the controller 23 causes the user I/F 22 to display the setting menu screen "All Settings" 98 depicted in FIG. 16A by setting the temporary release state with respect to the function(s) to which the setting lock is applied "ON" in the lock function setting information 35. Note that in the operation of causing the function to which the setting lock is applied to be in the temporarily released state, the lock temporary release icon 84 is operated so as to change the aspect of display to indicate the temporarily released state, similarly to the first embodiment.

Figure 16B:
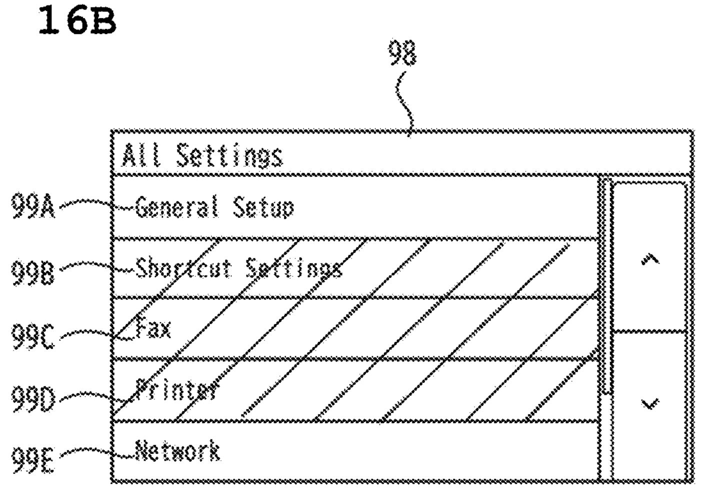

In a case where the temporary release flag is set to OFF (step S93: NO), the controller 23 proceeds to step S94 and determines whether the setting lock is set to be applied "ON" with respect to all the functions to each of which the setting lock is to be applied or not in the lock function setting information 35. In a case where the setting lock is applied only to a part of the functions to each of which the setting lock is to be applied or not (step S94: NO), the controller 23 proceeds to step S96 and causes the user I/F 22 to display the setting menu screen "All Settings" 98 which does not receive an operation with respect to a function or functions, of all the functions, to which the setting lock is applied "ON", as depicted in FIG. 16B. In the setting menu screen "All Settings" 98 depicted in FIG. 16B, the selection icons 99B, 99C, and 99D corresponding to the functions to which the setting lock is applied among the function to each of which the setting lock is to be applied or not are displayed in a gray-out state, thereby visually notifying the user that operations with respect to these selection icons 99B, 99C, and 99D are not received. On the other hand, the selection icons 99A and 99E corresponding to the functions to which setting lock has not been applied are not displayed in the gray-out state, thereby visually notifying the user that operations with respect to these selection icons 99A and 99 are receivable. For example, in a case where either one of the selection icons 99A and 99 which are not displayed in the gray-out state as depicted in FIG. 16B is operated on the setting menu screen "All Settings" 98, the controller 23 causes the user I/F 22 to display, from the setting menu screen "All Settings" 98, the setting screen corresponding to the operated selection icon.

On the other hand, in a case where the setting lock is set to be "ON" in the all the functions (step S94: YES), the controller 23 proceeds to step S95 and performs a setting menu screen display rejecting process. In the second embodiment, the setting menu screen display rejecting process is a process of not allowing the user I/F 22 to display the setting menu screen "All Settings" 98 even in a case where the controller 23 detects in step S90 that the setting icon 42 has been operated. That is, the displaying on the user I/F 22 remains the standby screen 40.

Figure 16C:
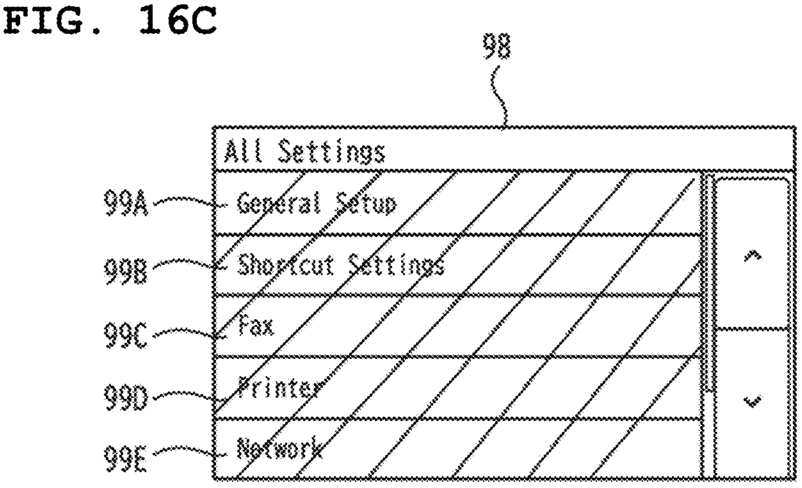

Note that the setting menu screen display rejecting process in step S95 may be a process of causing the user I/F 22 to display the setting menu screen "All Settings" 98 which disables the operation with respect to the displayed selection icon(s) on the user I/F 22, as depicted in FIG. 16C. In the setting menu screen "All Settings" 98 depicted in FIG. 16C, all of the selection icons 99A to 99E each corresponding to one of the functions are displayed in the gray-out state, thereby visually notifying the user that operations with respect to the selection icons 99A to 99E will not be received.

Figure 17A:
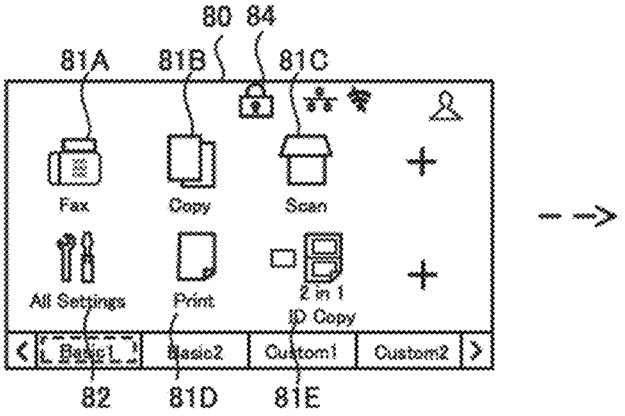
FIGS. 17A to 17C are diagrams depicting transition of screens displayed on a user I/F.

Next, a setting related to the temporary release of the setting lock in the second embodiment will be described. In the second embodiment, for convenience sake, the standby screen 80 in a state in which the setting lock is applied is depicted as FIG. 17A among FIGS. 17A to 17C. FIG. 17A is a screen which is the same as the screen depicted in FIG. 11G. In a case where the controller 23 detects that the lock temporary release icon 84 included in the standby screen 80 and indicating the locked state has been operated in a state wherein the setting lock is applied "ON" and the temporary release flag is set to "OFF", the controller 23 starts a process depicted in FIG. 18.

Figure 17B:
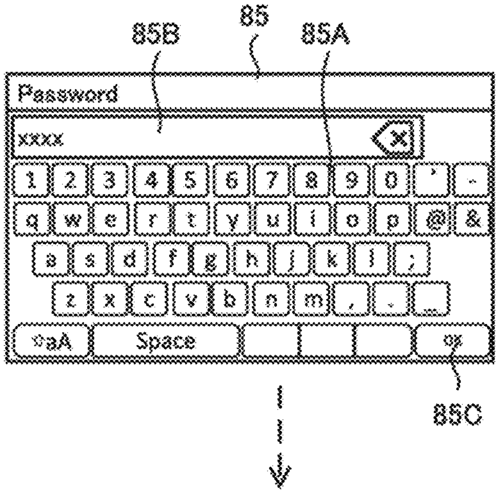
Figure 17C:
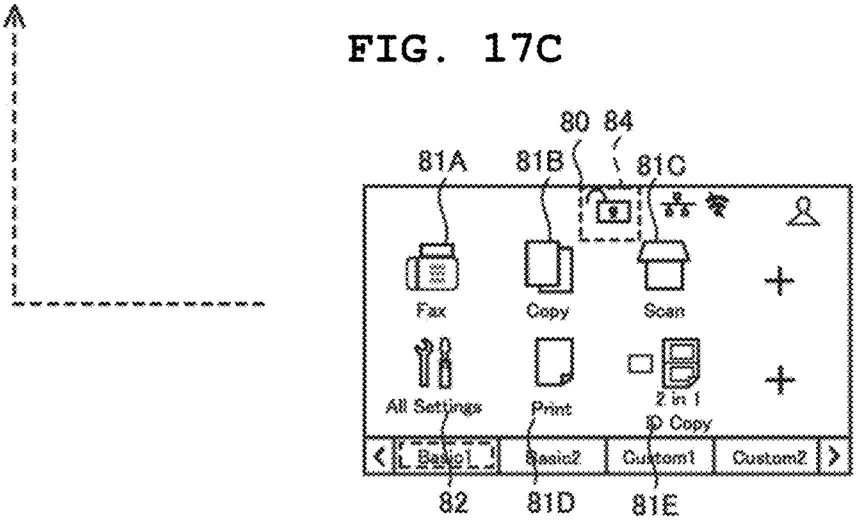
Figure 18:
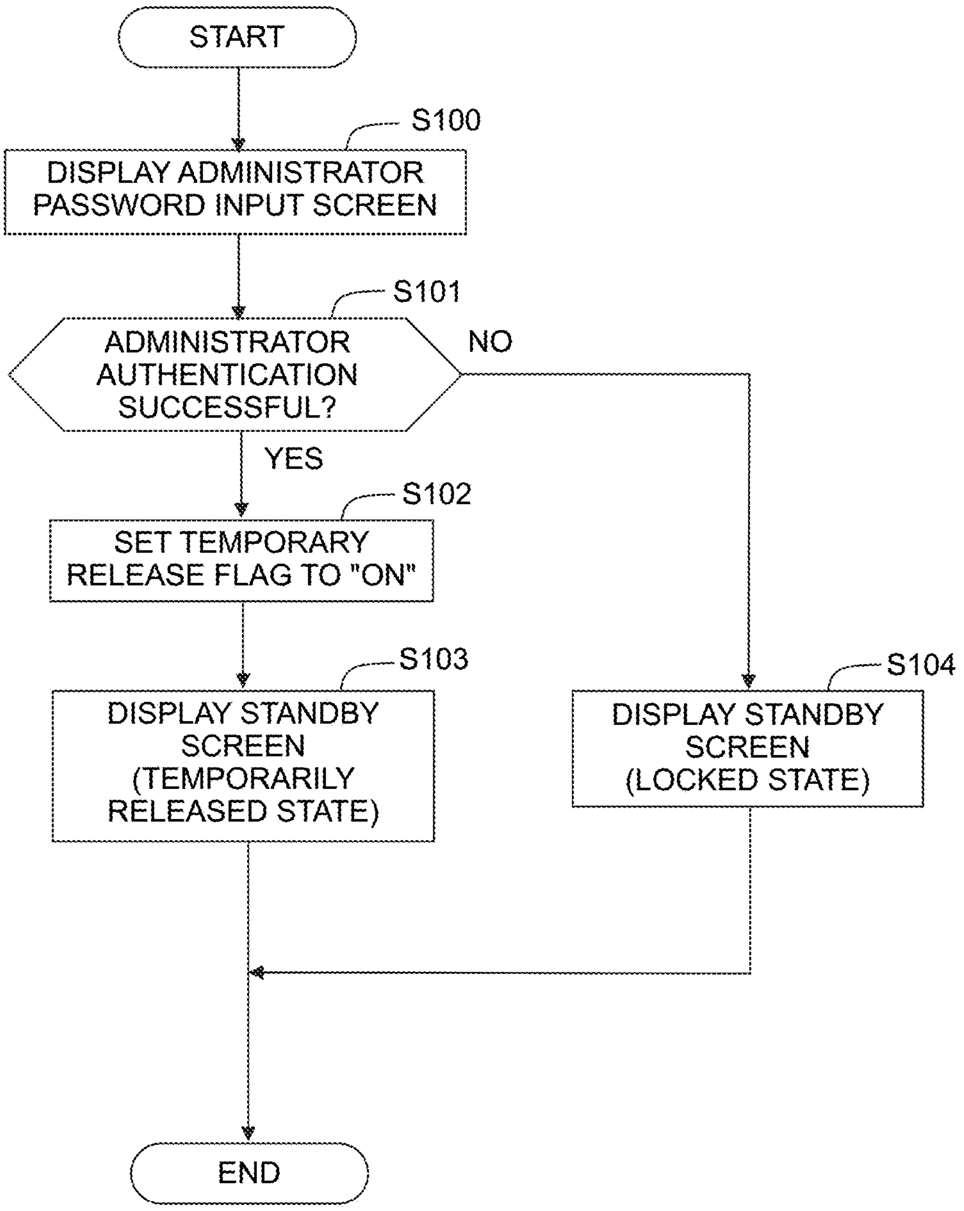
FIG. 18 is a flowchart describing changing of a setting value of a temporary releasing process.

First, in step S100, the controller 23 causes the user I/F 22 to display an administrator password input screen 85 depicted in FIG. 17B. The administrator password input screen 85 is a screen which is the same as the screen depicted in FIG. 11B. In a case where the user operates an input key 85A of the administrator password input screen 85 so as to input an administrator password, the input password is displayed in a password display column 85B. In a case where the user operates an OK button 85C in this state and where the input password matches the registered administrator password, the controller 23 determines that the administrator authentication has been successful (step S101: YES) and proceeds to step S102. That is, in the second embodiment, the setting related to the temporary release of the setting lock can be performed, on the condition that the administrator authentication using the administrator password has been successful, unlike the first embodiment wherein the authentication is made by using the lock password. Note that in a case where the password entered by the operation of the administrator password input screen 85 does not match the registered administrator password (step S101: NO), the controller 23 proceeds to step S104 and causes the user I/F 22 to re-display the standby screen 80 depicted in FIG. 17A. That is, in this case, the controller 23 determines that the administrator authentication has failed, and therefore the controller 23 does not receive the change of setting of the temporary release of the setting lock.

In a case where the controller 23 proceeds to step S102, the controller 23 sets the value of the temporary release flag stored in the volatile area of the memory 28 to "ON". Note that the setting value of the item "setting lock" in the lock function setting information 35 remains "ON". Further, the controller 23 proceeds to step S103 and causes the user I/F 22 to display the standby screen 80 depicted in FIG. 17C. On the standby screen 80 depicted in FIG. 17C, the aspect of display of the lock temporary release icon 84 has changed to an aspect of display (unlocked state) indicating the temporarily released state in which the lock of the setting icon 82 is temporarily released. In a state that the lock temporary release icon 84 indicating the temporarily released state is displayed on the standby screen 80, in a case where the user operates the setting icon 82, since the temporary release flag is "ON" (step S93: YES in FIG. 15), the controller 23 sets the function(s) to which the setting lock is applied "ON" to the temporarily released state, thereby causing the user I/F 22 to display the setting menu screen "All Settings" 98 depicted in FIG. 16A and described in the foregoing (step S97).

In the setting menu screen 98 displayed in the temporarily released state, the respective icons in FIG. 16A may include an icon which can be operated in a case where the setting lock is not applied but cannot be operated in the temporarily released state. The icons depicted in FIG. 16A may include an icon which is displayed in a case where the setting lock is not applied but is not displayed in the temporarily released state.

Note that in FIG. 17A, an operation will be described which is executed in a case where the user operates the lock temporary release icon 84 indicating the locked state on the standby screen 80 depicted in FIG. 17A so as to temporarily release the lock of the setting icon 82, and then the user sets the setting icon 82 to the locked state again by performing a manual operation. In this case, after the setting icon 82 has been set to the temporary released state, in a case where the controller 23 detects that the user operates the lock temporary release icon 84 indicating the temporarily released state on the standby screen 80 depicted in FIG. 17C, the controller 23 sets the temporary release flag stored in the volatile area of the memory 28 to the value indicating the "OFF" of the temporary release of the setting lock, similarly to step S50 of FIG. 9 described above. The controller 23 changes the aspect of display of the lock temporary release icon 84 included in the standby screen 80 from the aspect of display (unlocked state) indicating the temporarily released state to the aspect of display (locked-in state) indicating the locked state depicted in FIG. 17A, similarly to step S51 described above.

Note that also in the second embodiment, after the user operates the lock temporary release icon 84 indicating the locked state so as to set the setting icon 82 to the temporarily released state, the controller 23 can automatically cause the setting icon 82 to transition to the locked state with the lapse of time. In this case, the controller 23 detects the operation of temporarily releasing the locked state with respect to the lock temporary release icon 84 indicating the locked state similarly to the description above with reference to FIG. 10, and the controller 23 starts clocking of the time by operating the timer, similarly to step S61 described above. In a case where the predetermined time has not elapsed according to the clocking of the timer in step S62 (step S62: NO), the controller 23 proceeds to step S63 and determines whether an event in accordance with the operation on the currently displayed screen has occurred.

In a case where the controller 23 determines that the predetermined time has elapsed based on the clocking of the timer, without any event occurring, the controller 23 changes the temporary release flag stored in the volatile area of the memory 28 to "OFF" indicating the release from the temporarily released state, as described in step S67. Further, the setting value of the item "setting lock", which in the second embodiment is included in the lock function setting information 35, remains "ON". On the other hand, in a case where the controller 23 detects the occurrence of an event, the controller 23 initializes the clocking of the timer as described above in step S64, and the controller 23 re-counts the predetermined time, thereby extending the period of time since when the setting icon 82 has been in the temporarily released state until the setting icon 82 is automatically caused to be in the locked state. In this case also, the clocking of the timer is initialized (step S64) each time an event such as the operation of an icon, transition of the screens, reception of a print job, etc., occurs, thereby extending the temporary release state of the setting icon 82.

In a case where the controller 23 determines from the clocking of the timer that the extended time has elapsed, the controller 23 changes the temporary release flag stored in the volatile area of the memory 28 to "OFF" in step S67, as described above, and the controller 23 causes, in step S68, the user I/F 22 to re-display the standby screen 80 indicating that the setting icon 82 is in the locked state as depicted in FIG. 17A. The controller 23 initializes the clocking of the timer in step S69 and ends the process.

In the second embodiment as described above, the controller 23 prompts the operator to input the administrator password even in a case where the controller 23 causes the setting icon 82 to transition to the locked state by the operation via the screen which is displayed in a case where the user performs the predetermined operation including the operation on the standby screen 80 and the input of the administrator password; and the controller 23 causes the setting icon 82 to transition to the locked state in a case where the administrator authentication using the administrator password is successful. This enables only the administrator to apply the locked state or not to the setting icon 82, thereby preventing the security for the MFP 20 from being excessively decreased.

Modification of Second Embodiment

In the above-described second embodiment, the process of step S75 and the process of step S76 related to the setting of the setting lock and the process of step S102 related to the setting of the temporary release of the setting lock are executed on the condition that administrator authentication is successful by the input of the administrator password. Instead of this, in a case where authentication using the lock password used only for setting the setting lock, rather than using the administrator password, is successful, the process of step S75 and the process of step S76 related to the setting of the setting lock and the process of step S102 related to the setting of the temporary release may be executed, similarly to the first embodiment.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiments, the value indicating whether the setting lock is applied can be switched ON and OFF on the screen displayed on the user I/F 22 by the operation with respect to the standby screen. Instead of this, the setting lock may be switched ON and OFF by receiving an instruction from the external apparatus, such as the data PC 10 including a browser, via a web page for setting, which is provided by the MFP 20 to the browser, so as to switch ON and OFF the value indicating the setting lock. Other than this, the setting lock may not be switchable ON and OFF and may be always in the ON state. Even in this case, the controller 23 may cause the setting icon to be in the temporarily released state in response to the operation by the user, with the above-described method.

In the above-described embodiments, the icon which receives the operation of temporarily releasing the locked state of the setting icon has the shape including the mark and the text, or the shape of only the mark. Instead of this, the icon which receives the operation of temporarily releasing the locked state of the setting icon may have a shape including only the text.

The use of the MFP as the image forming apparatus is merely an example, and the image forming apparatus may be an apparatus having the single function such as the function of the print operation or the scan operation.

The present disclosure may include the following addenda 1 to 21.

Addendum 1

An image forming apparatus comprising: a user interface; a memory; and a controller. Wherein the controller is configured to execute a process related to image formation in accordance with a setting value stored in the memory. Wherein the controller is configured: to cause the user interface to display a standby screen including a screen display icon; and to cause the user interface to display a setting screen in response to the screen display icon having been operated on the standby screen, and to cause the memory to store the setting value in response to an operation received on the setting screen. Wherein the controller is configured to cause the user interface to transition to a locked state in response to an operation received via the user interface, the locked state being a state in which the controller does not allow the user interface to display the setting screen even in a case where the screen display icon is operated. Wherein in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated. Wherein the controller is configured to release the temporarily released state and to cause the user interface to return to the locked state, triggered by the temporarily released state having been continued for a predetermined period of time.

Addendum 2

The image forming apparatus according to Addendum 1, wherein the controller is configured to release the temporarily released state and cause the user interface to return to the locked state, triggered by the temporarily released state having been continued for the predetermined period of time while the standby screen is being displayed.

Addendum 3

The image forming apparatus according to Addendum 2, wherein in a case where an event in which the user interface is operated or an event in which image data is received occurs in a state that the standby screen is displayed during the temporarily released state, the controller is configured to make a time from occurrence of the temporarily released state to release of the temporarily released state longer than in a case where the event does not occur.

Addendum 4

The image forming apparatus according to Addendum 2, wherein in a case where an event involving screen transition occurs in a state that the standby screen is displayed during the temporarily released state, the controller is configured to make a time from occurrence of the temporarily released state to release of the temporarily released state longer than in a case where the event does not occur.

Addendum 5

An image forming apparatus comprising: a user interface; a memory; and a controller, wherein the controller is configured to execute a process related to image formation in accordance with a setting value stored in the memory. Wherein the controller is configured: to cause the user interface to display a standby screen including a screen display icon; and to cause the user interface to display a setting screen in response to the screen display icon having been operated on the standby screen, and to cause the memory to store the setting value in response to an operation received on the setting screen. Wherein the controller is configured to cause the user interface to transition to a locked state in response to an operation received via the user interface, the locked state being a state in which the controller does not allow the user interface to display the setting screen even in a case where the screen display icon is operated. Wherein in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated. Wherein the controller is configured to cause the user interface in the temporarily released state to display a re-lock icon, and to release the temporarily released state, triggered by the re-lock icon having been operated.

Addendum 6

The image forming apparatus according to Addendum 5, wherein the controller is configured to cause the user interface in the locked state to display a temporary release icon on the standby screen, and to release the temporarily released state, triggered by the re-lock icon having been operated. Wherein in the temporarily released state, the controller is configured not to cause the user interface to display the temporary release icon on the standby screen and to cause the user interface to display the re-lock icon on the standby screen, and to release the temporarily released state, triggered by the re-lock icon having been operated.

Addendum 7

The image forming apparatus according to Addendum 6, wherein the controller is configured to prompt for input of a lock temporary release password together with an operation of the temporary release icon displayed on the user interface in the locked state, and the controller is configured to cause the user interface to transition to the temporarily released state in a case where the lock temporary release password is input.

Addendum 8

The image forming apparatus according to Addendum 7, wherein the lock temporary release password is a password which is configured to be set by an operation by a user via the user interface.

Addendum 9

The image forming apparatus according to Addendum 8, wherein in a case where the controller causes the user interface to transition to the locked state in response to the operation received via the user interface, the controller is configured to cause the user interface to transition to the locked state by an operation by a user via a lock setting screen, which is displayed in a case where an operation including an operation on the standby screen is performed, and to set the lock temporary release password by the operation by the user via the lock setting screen.

Addendum 10

The image forming apparatus according to Addendum 9, wherein in a case where the controller causes the user interface to transition to the locked state in response to the operation received via the user interface, the controller is configured to prompt for input of a password same as the lock temporary release password also in a case where the controller causes the user interface to transition to the locked state by the operation by the user via the lock setting screen, and to cause the user interface to transition to the locked state in a case where the password same as the lock temporary release password is input.

Addendum 11

An image forming apparatus comprising: a user interface; a memory; and a controller, wherein the controller is configured to execute a process related to image formation in accordance with a setting value stored in the memory. Wherein the controller is configured: to cause the user interface to display a standby screen including a screen display icon; and to cause the user interface to display a setting screen in response to the screen display icon having been operated on the standby screen, and to cause the memory to store the setting value in response to an operation received on the setting screen. Wherein the controller is configured to cause the user interface to transition to a locked state in response to an operation received via the user interface, the locked state being a state in which the controller does not allow the user interface to display the setting screen even in a case where the screen display icon is operated. Wherein in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated. Wherein the controller is configured to prompt for input of an administrator password as the temporarily releasing operation, and the controller is configured to cause the user interface to transition to the temporarily released state in a case where the administrator password is input.

Addendum 12

The image forming apparatus according to Addendum 11, wherein the administrator password is a password configured to be set by an administrator or a password set at a time of manufacture of the image forming apparatus.

Addendum 13

The image forming apparatus according to Addendum 11, wherein in a case where the controller causes the user interface to transition to the locked state by an operation of a user via an administrator screen which is displayed, in a case where an operation including an operation on the standby screen and the input of the administrator password is performed, the controller is configured to prompt for the input of the administrator password. Wherein in a case where the administrator password is input, the controller is configured to cause the user interface to transition to the locked state.

Addendum 14

An image forming apparatus comprising: a user interface; a memory; and a controller, wherein the controller is configured to execute a process related to image formation in accordance with a setting value stored in the memory. Wherein the controller is configured: to cause the user interface to display a standby screen including a screen display icon, and to cause the user interface to display a setting screen in response to the screen display icon having been operated on the standby screen, and to cause the memory to store the setting value in response to an operation received on the setting screen. Wherein the controller is configured to cause the user interface to transition to a locked state in response to an operation received via the user interface, the locked state being a state in which the controller does not allow the user interface to display the setting screen even in a case where the screen display icon is operated. Wherein in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated. Wherein while the user interface is in the locked state, the controller is configured to prompt for input of a lock temporary release password together with a trigger for releasing the temporarily released state, and in a case where the lock temporary release password is input, the controller is configured to cause the user interface to transition to the temporarily released state. Wherein in a case where the lock temporary release password is not set, the controller is configured not to cause the user interface to transition to the locked state.

Addendum 15

The image forming apparatus according to Addendum 14, wherein the controller is configured to cause the user interface to transition to the locked state by an operation by a user via a lock setting screen which is displayed in a case where a predetermined operation is performed. Wherein in a case where the predetermined operation of displaying the lock setting screen is performed and where the lock temporary release password has not been set, the controller is configured to request the lock temporary release password to be set. Wherein in a case where the lock temporary release password is set, the controller is configured to display the lock setting screen.

Addendum 16

An image forming apparatus comprising: a user interface; a memory; and a controller, wherein the controller is configured to execute a process related to image formation in accordance with a setting value stored in the memory. Wherein the controller is configured: to cause the user interface to display a standby screen including a screen display icon; and to cause the user interface to display a setting screen in response to the screen display icon having been operated on the standby screen, and to cause the memory to store the setting value in response to an operation received on the setting screen. Wherein the controller is configured to cause the user interface to transition to a locked state in response to an operation received via the user interface, the locked state being a state in which the controller does not allow the user interface to display the setting screen even in a case where the screen display icon is operated. Wherein in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated. Wherein while the user interface is in the locked state, the controller is configured to prompt for input of a lock temporary release password together with a trigger for releasing the temporarily released state, and in a case where the lock temporary release password is input, the controller is configured to cause the user interface to transition to the temporarily released state. Wherein the controller is configured to cause the user interface to transition to the locked state by an operation by a user via a lock setting screen which is displayed in a case where a predetermined operation is performed. Wherein in a case where the predetermined operation of displaying the lock setting screen is performed and where the lock temporary release password has not been set, the controller is configured to request the lock temporary release password to be set. Wherein in a case where the lock temporary release password is set, the controller is configured to display the lock setting screen.

Addendum 17

An image forming apparatus comprising: a user interface; a memory; and a controller, wherein the controller is configured to execute a process related to image formation in accordance with a setting value stored in the memory. Wherein the controller is configured: to cause the user interface to display a standby screen including a screen display icon; and to cause the user interface to display a setting screen in response to the screen display icon having been operated on the standby screen, and to cause the memory to store the setting value in response to an operation received on the setting screen. Wherein the controller is configured to cause the user interface to transition to a locked state in response to an operation received via the user interface, the locked state being a state in which the controller does not allow the user interface to display the setting screen even in a case where the screen display icon is operated. Wherein in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated. Wherein in a case where the controller receives, in the temporary released state, an operation of instructing release of the locked state, the controller is configured to release both the temporarily released state and the locked state. Wherein in a case where the controller receives, while the user interface is in the locked state, the operation of instructing the release of the locked state and an administrator password, the controller is configured to release the locked state.

Addendum 18

The image forming apparatus according to Addendum 17, wherein in a case where the controller receives, in the locked state, the operation of instructing the release of the locked state via an administrator screen which is displayed in a case where a predetermined operation including an operation on the standby screen and input of the administrator password is performed, the controller is configured to release the locked state, the administrator screen being configured to be a screen different from the setting screen which ceases to be displayed in the locked state.

Addendum 19

The image forming apparatus according to Addendum 18, wherein the controller is configured to display a temporary release icon on the standby screen, in the locked state, and an operation of the temporary release icon is configured to trigger to release the locked state. Wherein the controller is configured to display an administrator screen icon on the standby screen, and to display the administrator screen in a case where a predetermined operation including an operation on the administrator screen icon and the input of the administrator password is performed.

Addendum 20

An image forming apparatus comprising: a user interface; a memory; and a controller, wherein the controller is configured to execute a process related to image formation in accordance with a setting value stored in the memory. Wherein the controller is configured: to cause the user interface to display a standby screen including a screen display icon; and to cause the user interface to display a setting screen in response to the screen display icon having been operated on the standby screen, and to cause the memory to store the setting value in response to an operation received on the setting screen. Wherein the controller is configured to cause the user interface to transition to a locked state in response to an operation received via the user interface, the locked state being a state in which the controller does not allow the user interface to display the setting screen even in a case where the screen display icon is operated. Wherein in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated. Wherein the controller is configured to display a temporary release icon on the standby screen, in the locked state, and in a case where the temporary release icon is operated, the controller is configured to cause the user interface to be in the temporarily released state. Wherein the controller is configured to display an administrator screen icon on the standby screen in the temporarily released state, and in a case where a predetermined operation including an operation on the administrator screen icon and input of an administrator password is performed, the controller is configured to display an administrator screen. Wherein in a case where the controller receives an operation instructing release of the locked state via the administrator screen, the controller is configured to release the locked state.

Addendum 21

An image forming apparatus comprising: a user interface; a memory; and a controller, wherein the controller is configured to execute a process related to image formation in accordance with a setting value stored in the memory. Wherein the controller is configured: to cause the user interface to display a standby screen including a screen display icon; and to cause the user interface to display a setting screen in response to the screen display icon having been operated on the standby screen, and to cause memory to store the setting value in response to an operation received on the setting screen. Wherein the controller is configured to cause the user interface to transition to a locked state in response to an operation received via the user interface, the locked state being a state in which the controller does not allow the user interface to display the setting screen even in a case where the screen display icon is operated. Wherein in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated, and the controller is configured to end the temporarily released state by a trigger which is different from an operation serving a trigger for the locked state-transition process. Wherein the controller is configured to cause the user interface to display a setting screen related to printing, in response to the screen displaying icon having been operated on the standby screen, and the controller is configured to cause the memory to store the setting value, in response to an operation received with respect to the setting screen related to the printing. Wherein the controller is configured to receive, on the setting screen related to the printing, at least one of an operation of specifying a printer description language to be emulated, an operation of specifying print quality, an operation of specifying whether to turn on double-sided printing or not, an operation of specifying a type of a sheet, an operation of specifying a size of the sheet, and an operation of specifying a print offset.

What is claimed is:

1. An image forming apparatus comprising:

a user interface;

a memory; and a controller, wherein the controller is configured to execute a process related to image formation in accordance with a setting value stored in the memory, the controller is configured:

to cause the user interface to display a standby screen including a screen display icon; and to cause the user interface to display a setting screen in response to the screen display icon having been operated on the standby screen, and to cause memory to store the setting value in response to an operation received on the setting screen, the controller is configured to cause the user interface to transition to a locked state in response to an operation received via the user interface, the locked state being a state in which the controller does not allow the user interface to display the setting screen even in a case where the screen display icon is operated, in a case where a temporarily releasing operation of temporarily releasing the locked state is performed while the user interface is in the locked state, the controller is configured to cause the user interface to be in a temporarily released state in which the controller allows the user interface to display the setting screen in response to the screen display icon having been operated, and the controller is configured to end the temporarily released state by a trigger which is different from an operation serving a trigger for a locked state-transition process, the controller is configured to cause the user interface to display a setting screen related to printing, in response to the screen displaying icon having been operated on the standby screen, and the controller is configured to cause the memory to store the setting value, in response to an operation received with respect to the setting screen related to the printing, and the controller is configured to receive, on the setting screen related to the printing, at least one of an operation of specifying a printer description language to be emulated, an operation of specifying print quality, an operation of specifying whether to turn on double-sided printing or not, an operation of specifying a type of a sheet, an operation of specifying a size of the sheet, and an operation of specifying a print offset.

2. The image forming apparatus according to claim 1, wherein the controller is configured so that the trigger for ending the temporarily released state is displaying the setting screen on the user interface in the temporarily released state and then displaying the standby screen.

3. The image forming apparatus according to claim 1, wherein the controller is configured to cause the user interface in the locked state to display a temporary release icon on the standby screen and is configured so that the temporarily releasing operation is an operation of the temporary release icon.

4. The image forming apparatus according to claim 3, wherein the controller is configured to prompt for input of a lock temporary release password together with an operation of the temporary release icon displayed on the user interface while the user interface is in the locked state, and the controller is configured to cause the user interface to transition to the temporarily released state in a case where the lock temporary release password is input.

5. The image forming apparatus according to claim 4, wherein the lock temporary release password is a password which is set by an operation by a user via the user interface.

6. The image forming apparatus according to claim 5, wherein in the locked state-transition process, the controller is configured to cause the user interface to transition to the locked state by an operation by a user via a lock setting screen, which is displayed in a case where a predetermined operation including an operation on the standby screen is performed, and to set the lock temporary release password by the operation by the user via the lock setting screen.

7. The image forming apparatus according to claim 6, wherein in the locked state-transition process, the controller is configured to prompt for input of a password same as the lock temporary release password also in a case where the controller causes the user interface to transition to the locked state by the operation by the user via the lock setting screen, and to cause the user interface to transition to the locked state in a case where the password same as the lock temporary release password is input.

8. The image forming apparatus according to claim 1, wherein the controller is configured to receive an operation of instructing release of the locked state via the user interface in the temporary released state, and in a case where the controller receives the operation of instructing release of the locked state, the controller is configured to release both the temporarily released state and the locked state.

9. The image forming apparatus according to claim 8, wherein in the locked state-transition process, the controller is configured not to receive the operation of instructing release of the locked state in the locked state.

10. The image forming apparatus according to claim 8, wherein the controller is configured to cause the user interface to transition to the locked state by an operation by a user via a lock setting screen which is displayed in a case where a predetermined operation including an operation of the screen display icon is performed, in a case where the controller receives the operation of instructing release of the locked state via the lock setting screen, the controller is configured to release the locked state, in the locked state, the controller is configured to cause the user interface not to display the lock setting screen in a case where a predetermined operation including an operation corresponding to the operation of the lock setting screen, and in the temporarily released state, the controller is configured to receive the operation of instructing release of the locked state via the lock setting screen by causing the user interface to display the lock setting screen in a case where the predetermined operation including the operation corresponding to the operation of the lock setting screen.

11. The image forming apparatus according to claim 1, wherein the controller is configured to release the temporarily released state and to cause the user interface to return to the locked state, triggered by the temporarily released state having been continued for a predetermined period of time.

12. The image forming apparatus according to claim 11, wherein the controller is configured to release the temporarily released state and cause the user interface to return to the locked state, triggered by the temporarily released state having been continued for the predetermined period of time while the standby screen is being displayed.

13. The image forming apparatus according to claim 12, wherein in a case where an event in which the user interface is operated or an event in which image data is received occurs in a state that the standby screen is displayed during the temporarily released state, the controller is configured to make a time from occurrence of the temporarily released state to release of the temporarily released state longer than in a case where the event does not occur.

14. The image forming apparatus according to claim 12, wherein in a case where an event involving screen transition occurs in a state that the standby screen is displayed during the temporarily released state, the controller is configured to make a time from occurrence of the temporarily released state to release of the temporarily released state longer than in a case where the event does not occur.

15. The image forming apparatus according to claim 1, wherein the controller is configured to cause the user interface in the temporarily released state to display a re-lock icon, and to release the temporarily released state, triggered by the re-lock icon having been operated.

16. The image forming apparatus according to claim 15, wherein the controller is configured to cause the user interface in the locked state to display a temporary release icon on the standby screen, and to release the temporarily released state, triggered by the re-lock icon having been operated, and in the temporarily released state, the controller is configured not to cause the user interface to display the temporary release icon on the standby screen and to cause the user interface to display the re-lock icon on the standby screen, and to release the temporarily released state, triggered by the re-lock icon having been operated.

17. The image forming apparatus according to claim 16, wherein the controller is configured to prompt for input of a lock temporary release password together with an operation of the temporary release icon displayed on the user interface in the locked state, and the controller is configured to cause the user interface to transition to the temporarily released state in a case where the lock temporary release password is input.

18. The image forming apparatus according to claim 17, wherein the lock temporary release password is a password which is configured to be set by an operation by a user via the user interface.

19. The image forming apparatus according to claim 18, wherein in a case where the controller causes the user interface to transition to the locked state in response to the operation received via the user interface, the controller is configured to cause the user interface to transition to the locked state by an operation by a user via a lock setting screen, which is displayed in a case where an operation including an operation on the standby screen is performed, and to set the lock temporary release password by the operation by the user via the lock setting screen.

20. The image forming apparatus according to claim 19, wherein in a case where the controller causes the user interface to transition to the locked state in response to the operation received via the user interface, the controller is configured to prompt for input of a password same as the lock temporary release password also in a case where the controller causes the user interface to transition to the locked state by the operation by the user via the lock setting screen, and to cause the user interface to transition to the locked state in a case where the password same as the lock temporary release password is input.

21. The image forming apparatus according to claim 1, wherein the controller is configured to prompt for input of an administrator password as the temporarily releasing operation, and the controller is configured to cause the user interface to transition to the temporarily released state in a case where the administrator password is input.

22. The image forming apparatus according to claim 21, wherein the administrator password is a password configured to be set by an administrator or a password set at a time of manufacture of the image forming apparatus.

23. The image forming apparatus according to claim 21, wherein in a case where the controller causes the user interface to transition to the locked state by an operation of a user via an administrator screen which is displayed, in a case where an operation including an operation on the standby screen and the input of the administrator password is performed, the controller is configured to prompt for the input of the administrator password, and in a case where the administrator password is input, the controller is configured to cause the user interface to transition to the locked state.

24. The image forming apparatus according to claim 1, wherein while the user interface is in the locked state, the controller is configured to prompt for input of a lock temporary release password together with a trigger for releasing the temporarily released state, and in a case where the lock temporary release password is input, the controller is configured to cause the user interface to transition to the temporarily released state, and in a case where the lock temporary release password is not set, the controller is configured to not to cause the user interface to transition to the locked state.

25. The image forming apparatus according to claim 24, wherein the controller is configured to cause the user interface to transition to the locked state by an operation by a user via a lock setting screen which is displayed in a case where a predetermined operation is performed, in a case where the predetermined operation of displaying the lock setting screen is performed and where the lock temporary release password has not been set, the controller is configured to request the lock temporary release password to be set, and in a case where the lock temporary release password is set, the controller is configured to display the lock setting screen.

26. The image forming apparatus according to claim 1, wherein the controller is configured to cause the user interface to transition to the locked state by an operation by a user via a lock setting screen which is displayed in a case where a predetermined operation is performed, in a case where the predetermined operation of displaying the lock setting screen is performed and where a lock temporary release password has not been set, the controller is configured to request the lock temporary release password to be set, and in a case where the lock temporary release password is set, the controller is configured to display the lock setting screen.

27. The image forming apparatus according to claim 1, wherein in a case where the controller receives, in the temporary released state, an operation of instructing release of the locked state, the controller is configured to release both the temporarily released state and the locked state, and in a case where the controller receives, while the user interface is in the locked state, the operation of instructing the release of the locked state and an administrator password, the controller is configured to release the locked state.

28. The image forming apparatus according to claim 27, wherein in a case where the controller receives, in the locked state, the operation of instructing the release of the locked state via an administrator screen which is displayed in a case where a predetermined operation including an operation on the standby screen and input of the administrator password is performed, the controller is configured to release the locked state, the administrator screen being configured to be a screen different from the setting screen which ceases to be displayed in the locked state.

29. The image forming apparatus according to claim 28, wherein the controller is configured to display a temporary release icon on the standby screen, in the locked state, and an operation of the temporary release icon is configured to trigger to release the locked state, and the controller is configured to display an administrator screen icon on the standby screen, and to display the administrator screen in a case where a predetermined operation including an operation on the administrator screen icon and the input of the administrator password is performed.

30. The image forming apparatus according to claim 1, wherein the controller is configured to display a temporary release icon on the standby screen, in the locked state, and in a case where the temporary release icon is operated, the controller is configured to cause the user interface to be in the temporarily released state, the controller is configured to display an administrator screen icon on the standby screen in the temporarily released state, and in a case where a predetermined operation including an operation on the administrator screen icon and input of an administrator password is performed, the controller is configured to display an administrator screen, and in a case where the controller receives an operation instructing release of the locked state via the administrator screen, the controller is configured to release the locked state.

* * * * *